US009489598B2

United States Patent
Gao et al.

(10) Patent No.: US 9,489,598 B2
(45) Date of Patent: Nov. 8, 2016

(54) SYSTEMS AND METHODS FOR OBJECT CLASSIFICATION, OBJECT DETECTION AND MEMORY MANAGEMENT

(71) Applicant: QUALCOMM Incorporated, San Diego, CA (US)

(72) Inventors: Dashan Gao, San Diego, CA (US); Yang Yang, San Diego, CA (US); Xin Zhong, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/609,104

(22) Filed: Jan. 29, 2015

(65) Prior Publication Data
US 2016/0063357 A1    Mar. 3, 2016

Related U.S. Application Data

(60) Provisional application No. 62/041,995, filed on Aug. 26, 2014.

(51) Int. Cl.
| | | |
|---|---|---|
| *G06K 9/00* | (2006.01) | |
| *G06K 9/62* | (2006.01) | |
| *G06K 9/46* | (2006.01) | |
| *G06N 7/00* | (2006.01) | |
| *G06N 99/00* | (2010.01) | |

(52) U.S. Cl.
CPC ........... *G06K 9/6269* (2013.01); *G06K 9/4604* (2013.01); *G06N 7/00* (2013.01); *G06N 99/005* (2013.01)

(58) Field of Classification Search
CPC .... G06N 99/005; G06N 7/00; G06K 9/4604; G06K 9/6269
See application file for complete search history.

(56) References Cited

U.S. PATENT DOCUMENTS

| 8,774,504 | B1 | 7/2014 | Sundareswara et al. | |
|---|---|---|---|---|
| 8,792,732 | B1 | 7/2014 | Zhao et al. | |
| 2005/0180627 | A1* | 8/2005 | Yang | G06K 9/00228 |
| | | | | 382/159 |
| 2007/0063548 | A1* | 3/2007 | Eipper | G06K 9/6284 |
| | | | | 296/203.01 |
| 2007/0094170 | A1* | 4/2007 | Graf | G06K 9/6269 |
| | | | | 706/15 |
| 2009/0018980 | A1* | 1/2009 | Zhang | G06K 9/00288 |
| | | | | 706/12 |
| 2009/0018981 | A1* | 1/2009 | Zhang | G06K 9/00288 |
| | | | | 706/12 |
| 2009/0018985 | A1* | 1/2009 | Zhang | G06K 9/6257 |
| | | | | 706/20 |
| 2009/0228411 | A1* | 9/2009 | Matsumoto | G06K 9/00711 |
| | | | | 706/12 |
| 2009/0228412 | A1* | 9/2009 | Matsumoto | G06K 9/00765 |
| | | | | 706/12 |
| 2010/0191683 | A1* | 7/2010 | Nguyen | G06K 9/6269 |
| | | | | 706/12 |
| 2011/0293136 | A1 | 12/2011 | Porikli | |
| 2012/0254077 | A1* | 10/2012 | Porikli | G06N 99/005 |
| | | | | 706/12 |
| 2013/0223726 | A1* | 8/2013 | Jiang | G06K 9/6287 |
| | | | | 382/159 |
| 2013/0223727 | A1 | 8/2013 | Jiang et al. | |
| 2014/0037198 | A1 | 2/2014 | Larlus-Larrondo et al. | |
| 2014/0254922 | A1 | 9/2014 | Wang et al. | |
| 2016/0063357 | A1* | 3/2016 | Gao | G06K 9/4604 |
| | | | | 382/159 |

OTHER PUBLICATIONS

Hua et al., "Incremental Learning Algorithm for Support Vector Data Description" (2011).*
Dekel O., et al., "The Forgetron: A Kernel-Based Perceptron on a Budget", Siam Journal on Computing., vol. 37, No. 5, Jan. 1, 2008 (Jan. 1, 2008), pp. 1342-1372, XP055218413, ISSN: 0097-5397, DOI: 10.1137/060666998.
International Search Report and Written Opinion—PCT/US2015/043313—ISA/EPO—Oct. 21, 2015.
* cited by examiner

*Primary Examiner* — Aaron W Carter
(74) *Attorney, Agent, or Firm* — Austin Rapp & Hardman

(57) ABSTRACT

A method for object classification by an electronic device is described. The method includes obtaining an image frame that includes an object. The method also includes determining samples from the image frame. Each of the samples represents a multidimensional feature vector. The method further includes adding the samples to a training set for the image frame. The method additionally includes pruning one or more samples from the training set to produce a pruned training set. One or more non-support vector negative samples are pruned first. One or more non-support vector positive samples are pruned second if necessary to avoid exceeding a sample number threshold. One or more support vector samples are pruned third if necessary to avoid exceeding the sample number threshold. The method also includes updating classifier model weights based on the pruned training set.

30 Claims, 17 Drawing Sheets

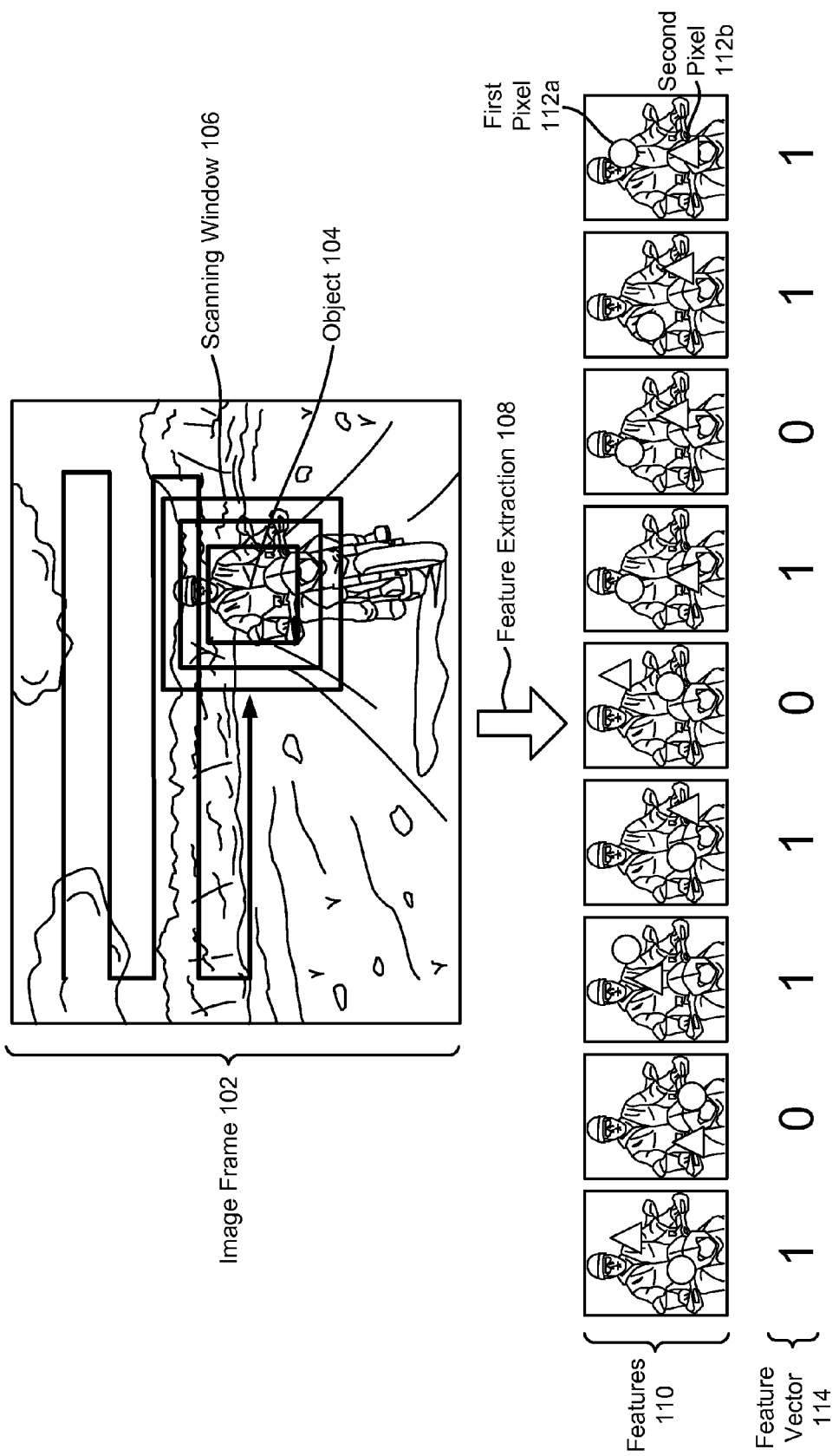

SYSTEMS AND METHODS FOR OBJECT CLASSIFICATION, OBJECT DETECTION AND MEMORY MANAGEMENT

RELATED APPLICATIONS

This application is related to and claims priority to U.S. Provisional Patent Application Ser. No. 62/041,995, filed Aug. 26, 2014, for "SYSTEMS AND METHODS FOR OBJECT CLASSIFICATION, OBJECT DETECTION AND MEMORY MANAGEMENT."

TECHNICAL FIELD

The present disclosure relates generally to electronic devices. More specifically, the present disclosure relates to systems and methods for object classification, object detection and memory management.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or more reliably are often sought after.

Some electronic devices utilize images. For example, a smartphone may capture and process still and/or video images. Processing images may demand a relatively large amount of time, memory and energy resources. The resources demanded may vary in accordance with the complexity of the processing.

It may be difficult to implement some complex processing tasks depending on the platform. For example, mobile platforms (e.g., mobile devices such as smartphones, tablets, laptop computers, etc.) may have limited processing, memory and/or energy resources (e.g., limited battery life). Additionally, requiring relatively large amounts of time to complete a complex task may lead to unsatisfactory performance, particularly for real-time applications. As can be observed from this discussion, systems and methods that improve image processing may be beneficial.

SUMMARY

A method for object classification by an electronic device is described. The method includes obtaining an image frame that includes an object. The method also includes determining samples from the image frame. Each of the samples represents a multidimensional feature vector. The method further includes adding the samples to a training set for the image frame. The method additionally includes pruning one or more samples from the training set to produce a pruned training set. One or more non-support vector negative samples are pruned first. One or more non-support vector positive samples are pruned second if necessary to avoid exceeding a sample number threshold. One or more support vector samples are pruned third if necessary to avoid exceeding the sample number threshold. The method also includes updating classifier model weights based on the pruned training set. The method may include reducing feature vectors based on associated weights to produce a reduced feature vector set.

All non-support vector negative samples may be pruned from the training set. Pruning the one or more samples may limit memory usage growth for a sequence of image frames and may reduce training time for the sequence of image frames.

The method may include selecting the one or more non-support vector positive samples at random. The method may include selecting the one or more support vector samples at random.

The method may include selecting the one or more non-support vector positive samples based on a distance between each of the one or more non-support vector positive samples and a decision boundary. The method may also include ordering the one or more non-support vector positive samples for pruning based on the distance. The one or more non-support vector positive samples with larger distances may be pruned first.

The method may include selecting the one or more non-support vector positive samples based on an age of the one or more non-support vector positive samples. The method may also include ordering the one or more non-support vector positive samples for pruning based on the age. The one or more non-support vector positive samples with greater ages may be pruned first.

The method may include selecting the one or more support vector samples based on an alpha value. The method may also include ordering the one or more support vector samples for pruning based on the alpha value. The one or more support vector samples with smaller alpha values may be pruned first.

The samples added to the training set may include support vector samples and incorrectly classified samples. Adding the samples to the training set may include storing the samples in a cache. Pruning the one or more samples may include removing the one or more samples from the cache.

An electronic device for object classification is also described. The electronic device includes a processor. The electronic device also includes memory in electronic communication with the processor. The electronic device further includes instructions stored in the memory. The instructions are executable to obtain an image frame that includes an object. The instructions are also executable to determine samples from the image frame. Each of the samples represents a multidimensional feature vector. The instructions are further executable to add the samples to a training set for the image frame. The instructions are additionally executable to prune one or more samples from the training set to produce a pruned training set. One or more non-support vector negative samples are pruned first. One or more non-support vector positive samples are pruned second if necessary to avoid exceeding a sample number threshold. One or more support vector samples are pruned third if necessary to avoid exceeding the sample number threshold. The instructions are also executable to update classifier model weights based on the pruned training set.

A computer-program product for object classification is also described. The computer-program product includes a non-transitory tangible computer-readable medium with instructions. The instructions include code for causing an electronic device to obtain an image frame that includes an object. The instructions also include code for causing the electronic device to determine samples from the image frame. Each of the samples represents a multidimensional feature vector. The instructions further include code for causing the electronic device to add the samples to a training set for the image frame. The instructions additionally include code for causing the electronic device to prune one or more samples from the training set to produce a pruned training set. One or more non-support vector negative samples are pruned first. One or more non-support vector positive samples are pruned second if necessary to avoid exceeding a sample number threshold. One or more support vector samples are pruned third if necessary to avoid exceeding the sample number threshold. The instructions also include code for causing the electronic device to update classifier model weights based on the pruned training set.

An apparatus for object classification is also described. The apparatus includes means for obtaining an image frame that includes an object. The apparatus also includes means for determining samples from the image frame. Each of the samples represents a multidimensional feature vector. The apparatus further includes means for adding the samples to a training set for the image frame. The apparatus additionally includes means for pruning one or more samples from the training set to produce a pruned training set. One or more non-support vector negative samples are pruned first. One or more non-support vector positive samples are pruned second if necessary to avoid exceeding a sample number threshold. One or more support vector samples are pruned third if necessary to avoid exceeding the sample number threshold. The apparatus also includes means for updating classifier model weights based on the pruned training set.

BRIEF DESCRIPTION OF THE DRAWINGS

FIG. 1A is a diagram illustrating an example of an approach for object detection using online Support Vector Machine (SVM);

DETAILED DESCRIPTION

Figure 1B:
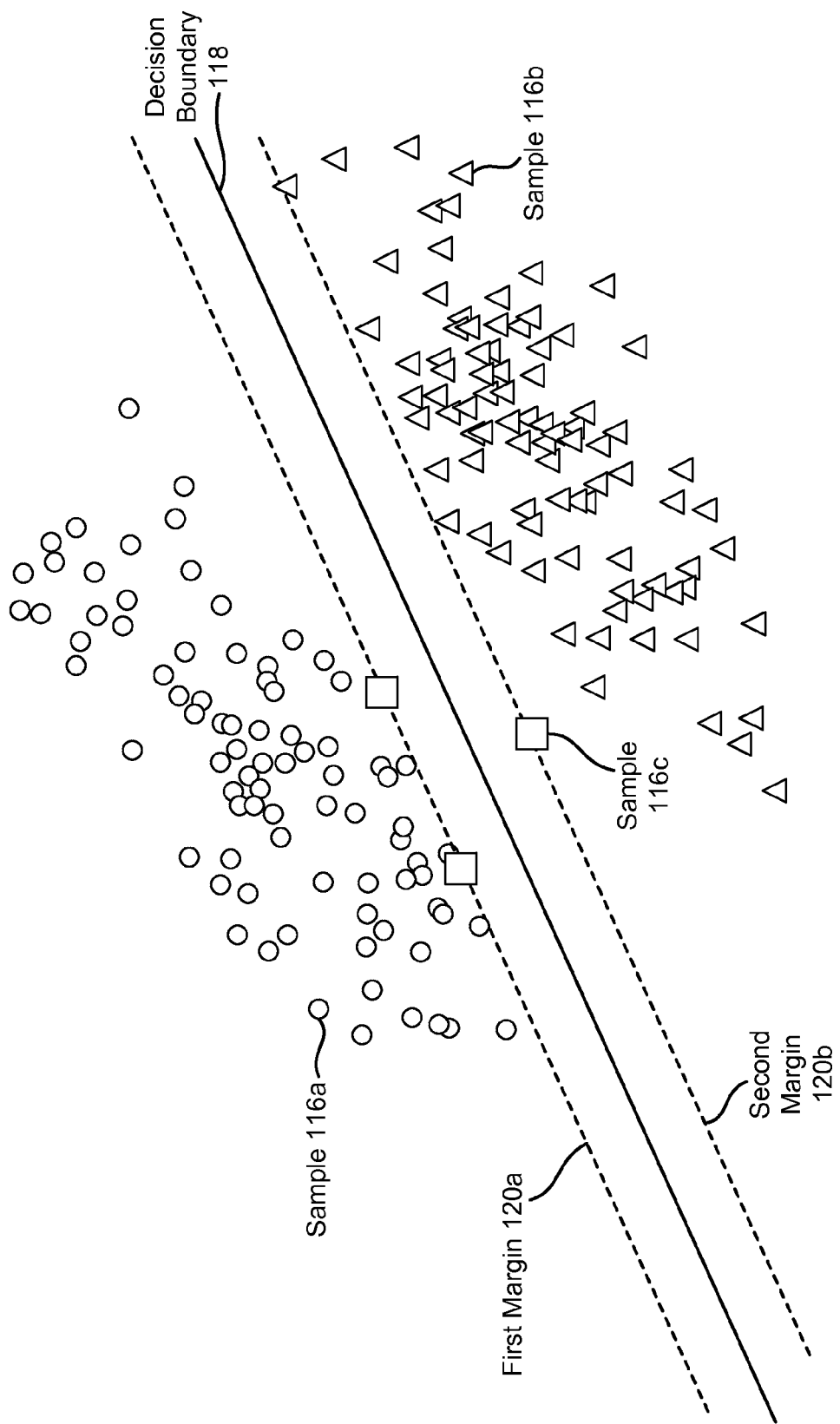
FIG. 1B is a diagram illustrating an example of a decision boundary in connection with the example of FIG. 1A.

The systems and methods disclosed herein may provide one or more approaches for object classification, object detection and/or memory management. For example, some configurations of the systems and methods disclosed herein may provide efficient online Support Vector Machine (SVM)—based object learning and detection for tracking. For real-time online tracking, the appearance of the tracked object may be learned online in real-time as well. In some configurations, SVM may be utilized for learning the appearance of a tracked object and/or may be modified to meet the requirement of real-time online learning.

Some features of the systems and methods disclosed herein may include one or more of the following. An online trained SVM-based object detector may be implemented for tracking. A warm start for each SVM training session may be utilized that provides (e.g., guarantees) quick and continuous convergence. A hard negative mining and/or sample pruning approach may be utilized, which may significantly reduce the time and memory required for each SVM training session (possibly with a slight drop in accuracy, for example). Efficient feature selection using the learned SVM weights on color-based binary features may reduce detection time (by approximately one third, for instance).

The online SVM training process may update the object appearance model incrementally with added samples at each learned frame. This may utilize a relatively small amount of memory by constantly pruning less—or non-informative learning samples. The online SVM may provide a fast and continuous convergence.

FIG. 1A is a diagram illustrating an example of an approach for object detection using online Support Vector Machine (SVM). The SVM approach may be contrasted with a decision forest approach, which is based on a naïve Bayes approach and assumes independency between features.

As illustrated in FIG. 1A, an image frame 102 may include an object 104 (e.g., the motorcyclist). The object 104 may vary in scale (e.g., size) and position. A classifier may be trained in order to detect and/or track the object. The detection and/or tracking may be accomplished with a scanning window. For example, a scanning window 106 with three sizes is illustrated in FIG. 1A. In some configurations, the scanning window 106 may follow a zig-zag pattern as illustrated on the image frame 102 in FIG. 1A.

In order to train the classifier, features may be extracted 108. For example, each of the features may be based on a set (e.g., pair) of pixels. In the example illustrated in FIG. 1A, 9 features 110 are illustrated (e.g., a 9-dimensional feature space), each with a pair of pixels 112. For purposes of illustration, a first pixel in each of the nine features 110 is marked with a circle and a second pixel in each of the nine features 110 is marked with a triangle. If the first pixel 112a is greater than the second pixel 112b (in intensity, for example), that feature dimension is assigned a 1. Otherwise, the feature dimension is assigned a 0. The result is a multi-dimensional feature vector. A 9-dimensional feature vector 114 is given as an example in FIG. 1A. It should be noted that feature vectors with more or fewer dimensions may be utilized.

FIG. 1B is a diagram illustrating an example of a decision boundary in connection with the example of FIG. 1A. The SVM approach captures dependency by learning jointly from the multi-dimensional feature vectors. For example, the 9-dimensional feature vector 114 may be viewed as a joint distribution, rather than a single value. Each feature vector may represent a sample (e.g., the samples 116 illustrated in FIG. 1B as circles, triangles and squares).

Training in the SVM approach attempts to determine a decision boundary. In a high-dimensional space, the decision boundary may be a hyperplane. In the example illustrated in FIG. 1B, the decision boundary 118 is illustrated as a solid line between the groups of samples 116a-c. Decision boundary margins 120a-b are also illustrated as dashed lines above and below the decision boundary 118 in FIG. 1B. The decision boundary attempts to separate non-support vector positive samples (e.g., the samples 116a denoted as circles outside (or above) the upper decision boundary margin 120a in FIG. 1B) and non-support vector negative samples (e.g., the samples 116b denoted as triangles outside (or below) the lower decision boundary margin 120b in FIG. 1B). Non-support vector positive samples originate from one or more windows on the desired object. Non-support vector negative samples originate from windows in other parts of the image. The samples on the decision boundary margins (e.g., samples 116c denoted as squares on the margins 120a-b in FIG. 1B) are support vector samples.

As illustrated, the SVM approach may utilize a maximum margin classifier. Better generalization may be achieved with a small sample set. Empirically, SVM works well on many classification tasks. The decision boundary may be utilized as a threshold to distinguish between the object and background in the image. For example, an electronic device may determine that a scanning window corresponds to an object if a feature vector is on a particular side (e.g., positive side) of the decision boundary.

Figure 2:
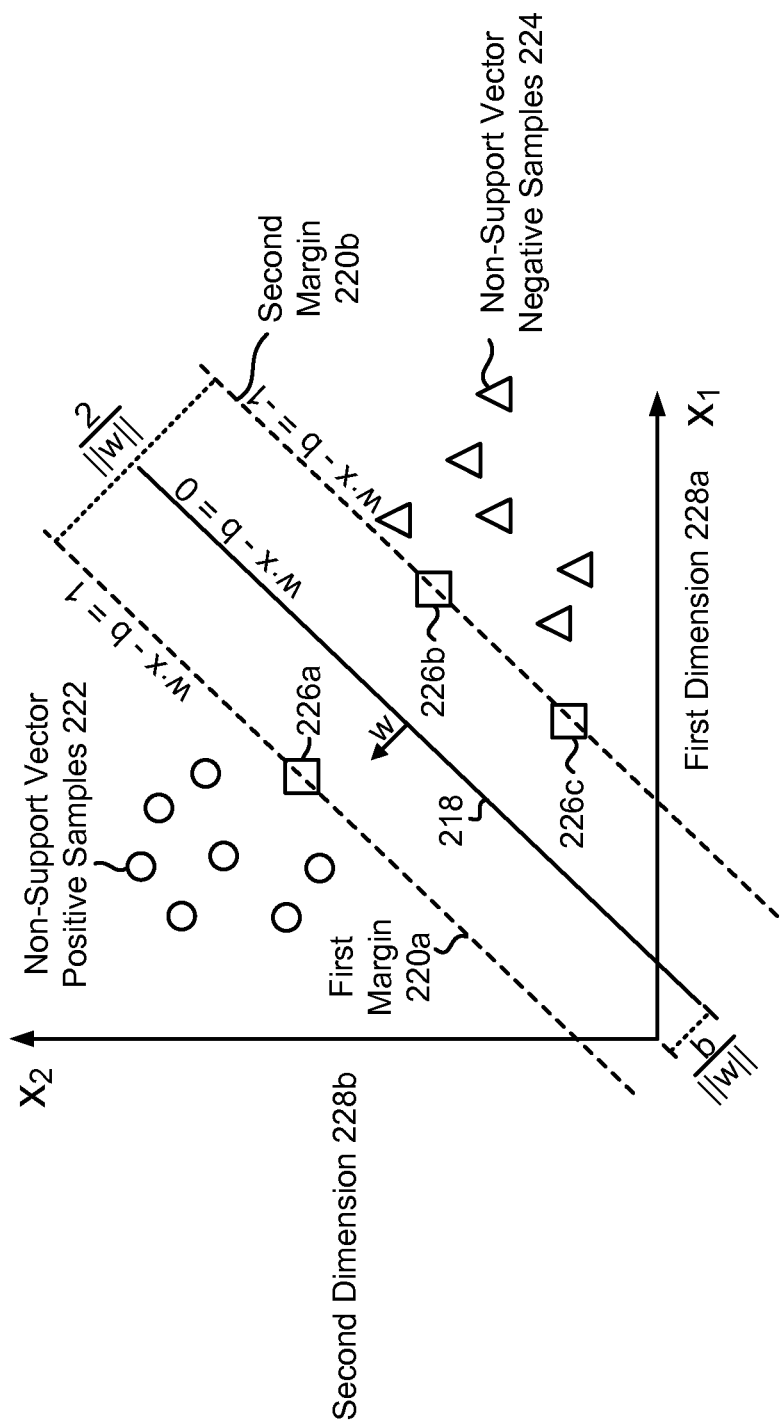
FIG. 2 is a diagram illustrating a general example of linear SVM.

FIG. 2 is a diagram illustrating a general example of linear SVM. In particular, FIG. 2 illustrates an overview of linear SVM. The primal form of linear SVM is illustrated by Equations (1)-(2).

$$y_i(w \cdot x_i - b) \geq 1 - \xi_i \quad 1 \leq i \leq n \quad (1)$$

$$\operatorname*{argmin}_{w, \xi, b} \left\{ \frac{1}{2} \|w\|^2 + C \sum_{i=1}^{n} \xi_i \right\} \quad (2)$$

subject to (for any $i = 1, \ldots, n$),
$y_i(w \cdot x_i - b) \geq 1 - \xi_i, \xi_i \geq 0$ $y_i$ is a class indicator or label (with a value of either 1 or −1, for example), indicating the class to which the point $x_i$ belongs. Each $x_i$ is a p-dimensional real vector, where p is the dimension of each feature vector. n is a total number of x vectors (e.g., samples, examples, etc.). w is the normal vector to the hyperplane. The parameter b determines the offset of the hyperplane from the origin along the normal vector w. $\xi_i$ is a non-negative slack variable, which measures the degree of misclassification of the data x. SVM may present a quadratic problem of maximizing the margin.

The example given in FIG. 2 illustrates a decision boundary 218 with a first margin 220a and a second margin 220b. As illustrated in FIG. 2, the non-support vector positive samples 222 (denoted with circles) are outside of the first margin 220a, while the non-support vector negative samples 224 (denoted with triangles) are outside of the second margin 220b. In this example, a first support vector sample 226a (denoted with a square) is on the first margin 220a. Additionally, a second support vector sample 226b (denoted with a square) and a third support vector sample 226c (denoted with a square) are on the second margin 220b. In FIG. 2, the samples 222, 224, 226 are illustrated in a first dimension 228a and a second dimension 228b. It should be noted that samples may have two or more dimensions in some configurations.

Some (e.g., off-the-shelf) SVM solvers (e.g., LibLinear, LibSVM) may not work well in some applications. For example, known SVM solvers may train on an entire dataset and may not provide for an online update where data arrives sequentially. However, in some cases addressed by the systems and methods herein, data arrives sequentially and the whole data set cannot be obtained to train the model. In other words, some applications may not allow waiting for an entire data set to be obtained. In some configurations of the systems and methods disclosed herein, the model may be trained when data is available. For example, the model may be updated when new data arrives. This may be referred to as an "online update." When updating in some configurations, the systems and methods disclosed herein may not solve from scratch, as this may be too slow. Instead, a warm start may be utilized in some configurations.

Known SVM solvers may not limit samples (e.g., a number of samples). In particular, known SVM solvers keep adding positive and negative samples, which may lead to an infinite number of samples (e.g., infinite negative samples). In some configurations of the systems and methods disclosed herein, hard negative mining may be utilized to reduce cache growth.

Figure 3:
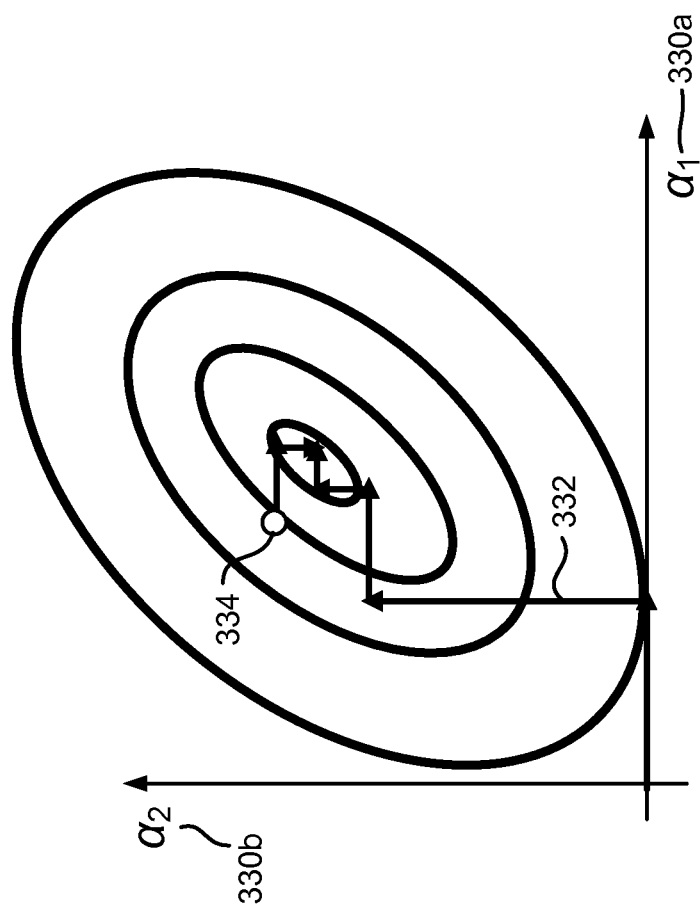
FIG. 3 is a diagram providing an example of a dual coordinate solver for online SVM.

FIG. 3 is a diagram providing an example of a dual coordinate solver for online SVM. In particular, Equations (3)-(4) illustrate an example of the dual form.

$$\tilde{L}(\alpha) = \sum_{i=1}^{n} \alpha_i - \frac{1}{2} \sum_{i,j} \alpha_i \alpha_j y_i y_j k(x_i, x_j) \quad (3)$$

subject to (for any $i = 1, \ldots, n$),
$0 \leq \alpha_i \leq C$ $$w = \sum_{i} \alpha_i y_i x_i \quad (4)$$

In Equations (3)-(4), i and j are indexes of the x vectors (e.g., samples, examples). $k(x_i, x_j)$ is a kernel function defined by $k(x_i, x_j) = x_i \cdot x_j$. $\alpha_i$ and $\alpha_j$ are Legrange multipliers. $\tilde{L}(\alpha)$ is an objective function that is sought to be maximized in terms of $\alpha$. In some configurations, training may be carried out in accordance with Equation (3) and/or Equation (4).

The dual form may provide a faster linear SVM solver (faster than solving the primal). This illustrates a duality gap. The graph illustrated in FIG. 3 provides an example of solving for (e.g., learning) alpha values, where $\alpha_1$ 330a and $\alpha_2$ 330b are examples of the alpha values (e.g., $\alpha_i$) provided in the Equations (3)-(4). As illustrated in FIG. 3, solving for (e.g., learning) alpha values may be achieved through a dual coordinate quadratic programming (QP) solver. More generally, with N samples and n alpha values, one alpha value may be updated while holding the other fixed. This procedure may be iterated over all the alphas with multiple interactions until convergence. One example of this iteration is illustrated in FIG. 3 as the stepping arrows 332 that converge on the solution after several steps.

In some configurations of online updating, a warm start may be utilized. In the warm start, previous alpha values (corresponding to a previous image frame, for example) may be utilized as initialization (for a current image frame, for example). Rather than start from the origin in solving for alpha values (as illustrated by the arrows stepping from the origin), some configurations of the systems and methods disclosed herein may start from previous alpha values (as illustrated by the dot 334 in the graph, for example). This may guarantee quick and continuous convergence. In particular, one or more of the configurations herein may utilize a faster SVM solver (at least as fast as LibLinear, for example), since it is convex and quadratic. However, one or more of the configurations herein may avoid using an infinite number of negative samples (which LibLinear cannot save, for example).

Figure 4:
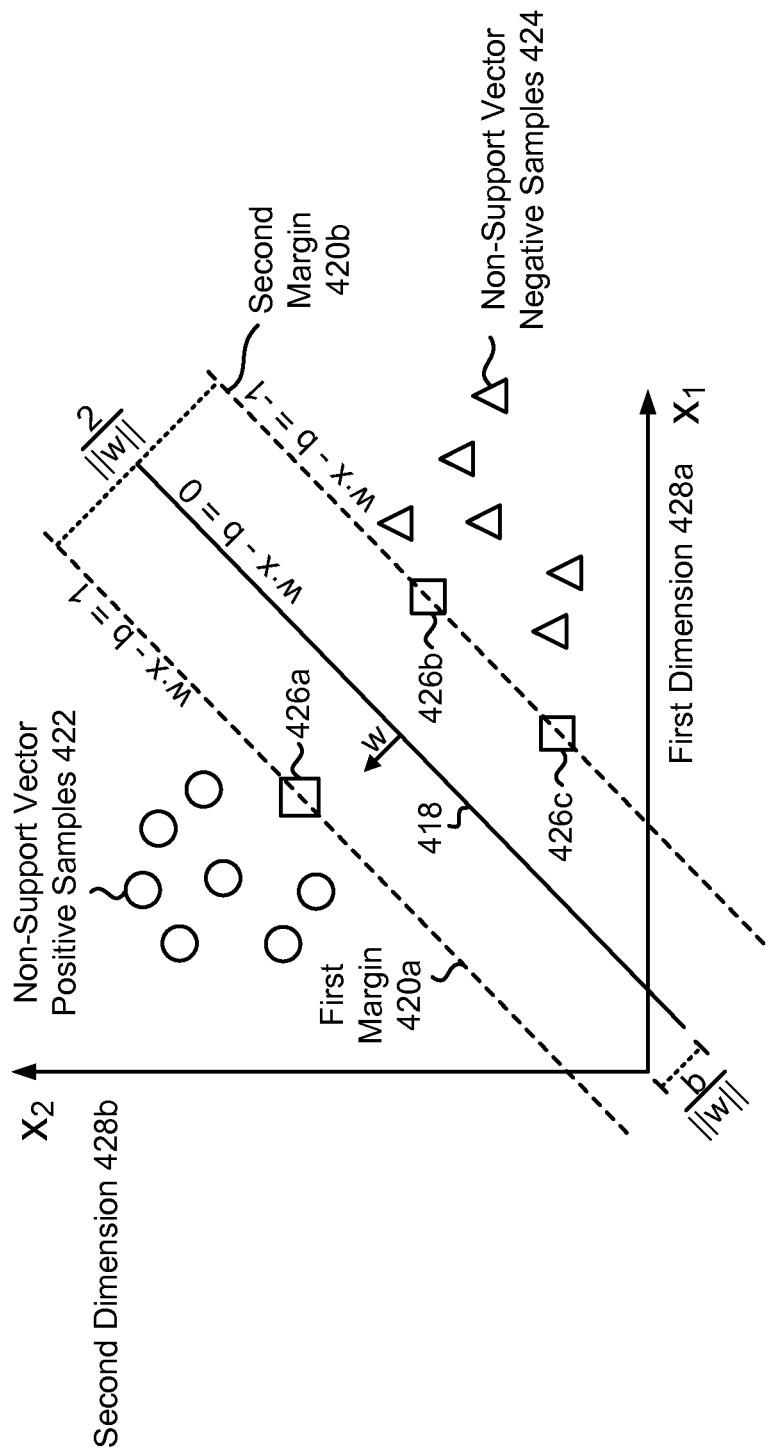
FIG. 4 is a diagram illustrating an example of sample pruning in accordance with the systems and methods disclosed herein.

FIG. 4 is a diagram illustrating an example of sample pruning in accordance with the systems and methods disclosed herein. For instance, one or more configurations of the systems and methods disclosed herein may be implemented with limited memory, which contrasts with the infinite sample problem posed by other approaches. In particular, storing an infinite number of samples requires infinitely large memory. However, only limited memory may be available on an electronic device (e.g., mobile devices). Accordingly, the systems and methods disclosed herein may limit the number of samples added to each training process.

The example given in FIG. 4 illustrates a decision boundary 418 with a first margin 420a and a second margin 420b. As illustrated in FIG. 4, the non-support vector positive samples 422 (denoted with circles) are outside of the first margin 420a, while the non-support vector negative samples 424 (denoted with triangles) are outside of the second margin 420b. In this example, a first support vector sample 426a (denoted with a square) is on the first margin 420a. Additionally, a second support vector sample 426b (denoted with a square) and a third support vector sample 426c (denoted with a square) are on the second margin 420b. In FIG. 4, the samples 422, 424, 426 are illustrated in a first dimension 428a and a second dimension 428b. It should be noted that samples may have two or more dimensions in some configurations. It should be noted that a positive sample may be a feature vector from an object or target that is sought to be tracked (in the tracking case, for example) and/or recognized. A negative sample may be any other feature vector that is not from the object or target. In some configurations, the label for a positive sample may be $y_i=1$. The label of negative sample may be $y_i=-1$. If $y_i(w \cdot x_i-b)=1$, for example, then $x_i$ may be called a support vector. Otherwise, $x_i$ is not a support vector.

One or more of the following approaches may be utilized to reduce and/or limit the number of samples. Hard negative/positive mining may be utilized. In hard negative/positive mining, only hard samples (e.g., wrongly classified samples) may be added as new samples for training. One or more samples may be pruned after a training procedure (e.g., after learning alpha values) and/or when a total number of samples exceeds the sample cache size.

In some configurations, one or more pruning priorities may be utilized. For example, non-support vector negative samples 424 (represented by the triangles outside the second margin 420b, for example) may be pruned. For instance, non-support vector negative samples 424 may be determined and added to a training set (and stored in a cache, for example). After a training procedure (e.g., after learning alpha values), the non-support vector negative samples 424 may be pruned (e.g., removed from the training set and/or the cache). In some configurations, the non-support vector negative samples 424 may have the highest pruning priority. For example, one or more (e.g., all) of the non-support vector negative samples 424 may be pruned after a training procedure (e.g., after learning alpha values) for each image frame. In other words, one or more non-support vector negative samples 424 may be pruned first.

One or more non-support vector positive samples 422 (represented by the circles outside the first margin 420a, for example) may be pruned to avoid exceeding a sample number threshold (e.g., may be pruned if keeping all non-support vector positive samples in the cache would exceed the sample number threshold and/or would diminish a cache buffer below a buffer threshold). For example, assume a cache capacity of 20,000 (e.g., 20 k) samples, including a buffer of 1,000 (e.g., 1 k) samples. After a training procedure (e.g., after learning alpha values), one or more non-support vector positive samples 422 may be pruned in order to avoid exceeding 19,000 samples stored in the cache (or to avoid diminishing the buffer below 1,000). In other words, one or more non-support vector positive samples 422 may be pruned (e.g., pruned second) if necessary to avoid exceeding a sample number threshold.

In some approaches, only a number of non-support vector positive samples 422 may be pruned sufficient to reduce the number of samples in the cache to equal the sample number threshold or to be less than the sample number threshold. Continuing the foregoing example, assume that 19,050 samples are stored in the cache after pruning all of the non-support vector negative samples 424, where 100 of the samples are non-support vector positive samples 422. In one approach, 50 non-support vector positive samples 422 may be pruned to reduce the cache size to 19,000 to equal the sample number threshold. In another approach, 51 non-support vector positive samples 422 may be pruned to reduce the cache size to 18,999 to be less than the sample number threshold. In yet another approach, all non-support vector positive samples 422 may be pruned to reduce the cache size to 18,950.

In some configurations, selecting one or more of the non-support vector positive samples 422 for pruning may be accomplished in accordance with one or more schemes. In one approach, the one or more non-support vector positive samples 422 may be selected at random. In another approach, the one or more non-support vector positive samples 422 may be selected based on a distance between each of the one or more non-support vector positive samples 422 and the decision boundary 418. The one or more non-support vector positive samples 422 may be ordered for pruning based on the distance, where the one or more non-support vector positive samples 422 with larger distances (further from the decision boundary 418) are pruned first. For example, an electronic device may calculate the distance corresponding to each of the non-support vector positive samples 422. The non-support vector positive samples may then be ordered (e.g., sorted, indexed, etc.) to indicate an order (e.g., increasing order, decreasing order, etc.) of distances. An electronic device may then prune (e.g., remove, delete, etc.) beginning at the non-support vector positive samples 422 with the largest distances until the number of samples in the cache is reduced to the sample number threshold (or less), or until all of the non-support vector positive samples have been removed.

In yet another approach, the one or more non-support vector positive samples 422 may be selected based on an age (from determination in time, number of frames, etc.) of the one or more non-support vector positive samples 422. The one or more non-support vector positive samples 422 may be ordered for pruning based on the age, where the one or more non-support vector positive samples 422 with greater ages (e.g., older samples) are pruned before one or more non-support vector positive samples 422 with lesser ages. For example, an electronic device may record a timestamp corresponding to each of the non-support vector positive samples 422, where the timestamp indicates the time of creation or storage of the corresponding non-support vector positive sample 422. The non-support vector positive samples may then be ordered (e.g., sorted, indexed, etc.) to indicate an order (e.g., increasing order, decreasing order, etc.) of ages. An electronic device may then prune (e.g., remove, delete, etc.) beginning at the oldest non-support vector positive samples 422 until the number of samples in the cache is reduced to the sample number threshold (or less), or until all of the non-support vector positive samples have been removed.

In yet another approach, a combination of selection schemes may be utilized. For example, a weighted decision based on distance and age may be utilized. For instance, an electronic device may compute a score for each non-support vector positive sample based on a weighted combination of the distance and age corresponding to each non-support vector positive sample. In general, an older age and a larger distance may influence the score to indicate a higher pruning priority (amongst the non-support vector positive samples), while a younger age and a shorter distance may influence the score to indicate a lower pruning priority (amongst the non-support vector positive samples). The non-support vector positive samples may then be ordered (e.g., sorted, indexed, etc.) to indicate an order (e.g., increasing order, decreasing order, etc.) of scores. An electronic device may then prune (e.g., remove, delete, etc.) beginning at the non-support vector positive samples with scores indicating a higher pruning priority until the number of samples in the cache is reduced to the sample number threshold (or less), or until all of the non-support vector positive samples have been removed.

As described above, the non-support vector negative samples 424 may be pruned at a highest priority (e.g., first). In comparison, the non-support vector positive samples 422 may be pruned at a lower priority (e.g., second) than the non-support vector negative samples. For example, the non-support vector negative samples 424 (e.g., all of the non-support vector negative samples 424) may be pruned unconditionally at each iteration after a training procedure, whereas the non-support vector positive samples 422 may be pruned only if there is no room remaining in the cache besides the buffer.

One or more support vector samples 426 (denoted by squares on the margins 420a-b, for example) may be pruned to avoid exceeding a sample number threshold (e.g., may be pruned if keeping all support vector samples in the cache would exceed the sample number threshold and/or would diminish a cache buffer below a buffer threshold). For example, assume a cache capacity of 20,000 samples, including a buffer of 1,000 samples. After a training procedure (e.g., learning alpha values), one or more support vector samples 426a-c may be pruned in order to avoid exceeding 19,000 samples stored in the cache (or to avoid diminishing the buffer below 1,000). In other words, one or more support vector samples 426 may be pruned (e.g., pruned third) if necessary to avoid exceeding a sample number threshold.

In some approaches, only a number of support vector samples 426 may be pruned sufficient to reduce the number of samples in the cache to equal the sample number threshold or to be less than the sample number threshold. For example, assume that 19,050 samples are stored in the cache after pruning all of the non-support vector negative samples 424 and all of the non-support vector positive samples 422, where all of the samples remaining are support vector samples 426. In one approach, 50 support vector samples 426 may be pruned to reduce the cache size to 19,000 to equal the sample number threshold. In another approach, 51 support vector samples 426 may be pruned to reduce the cache size to 18,999 to be less than the sample number threshold.

In some configurations, selecting one or more of the support vector samples 426 for pruning may be accomplished in accordance with one or more schemes. In one approach, the one or more support vector samples 426 may be selected at random. In another approach, the one or more support vector samples 426 may be selected based on an alpha value. The one or more support vector samples 426 may be ordered for pruning based on the alpha value, where the one or more support vector samples 426 with smaller alpha values are pruned before support vector samples 426 with larger alpha values. Examples of alpha values are given in connection with Equation (3) and FIG. 3. Alpha values may provide an indication of relative importance and/or weight, with larger alpha values indicating increased importance to the model. For example, larger (e.g., "greater") and smaller (e.g., "lesser") alpha values may refer to the magnitude of the $\alpha$ associated with a sample x.

For example, an electronic device may calculate the alpha corresponding to each of the support vector samples 426. The support vector samples may then be ordered (e.g., sorted, indexed, etc.) to indicate an order (e.g., increasing order, decreasing order, etc.) of alphas. An electronic device may then prune (e.g., remove, delete, etc.) beginning at the support vector samples 426 with the smallest alphas until the number of samples in the cache is reduced to the sample number threshold (or less).

In yet another approach, the one or more support vector samples 426 may be selected based on an age (from determination in time, number of frames, etc.) of the one or more support vector samples 426. The one or more support vector samples 426 may be ordered for pruning based on the age, where the one or more support vector samples 426 with greater ages (e.g., older samples) are pruned before one or more support vector samples 426 with lesser ages. For example, an electronic device may record a timestamp corresponding to each of the support vector samples 426, where the timestamp indicates the time of creation or storage of the corresponding support vector sample 426. The support vector samples 426 may then be ordered (e.g., sorted, indexed, etc.) to indicate an order (e.g., increasing order, decreasing order, etc.) of ages. An electronic device may then prune (e.g., remove, delete, etc.) beginning at the oldest support vector samples 426 until the number of samples in the cache is reduced to the sample number threshold (or less).

In yet another approach, a combination of selection schemes may be utilized. For example, a weighted decision based on alpha value and age may be utilized. For instance, an electronic device may compute a score for each support vector sample based on a weighted combination of the alpha value and age corresponding to each support vector sample. In general, an older age and a smaller alpha value may influence the score to indicate a higher pruning priority (amongst the support vector samples), while a younger age and a higher alpha value may influence the score to indicate a lower pruning priority (amongst the support vector samples). The support vector samples may then be ordered (e.g., sorted, indexed, etc.) to indicate an order (e.g., increasing order, decreasing order, etc.) of scores. An electronic device may then prune (e.g., remove, delete, etc.) beginning at the support vector samples with scores indicating a higher pruning priority until the number of samples in the cache is reduced to the sample number threshold (or less).

As described above, the non-support vector negative samples 424 may be pruned at a highest priority (e.g., first). The non-support vector positive samples 422 may be pruned at a lower priority than the non-support vector negative samples 424 (e.g., second). The support vector samples 426 may be pruned at an even lower priority than the non-support vector positive samples 422 (e.g., third or last). For example, the non-support vector negative samples 424 may be pruned unconditionally at each iteration after a training procedure (e.g., after learning alpha values in each iteration), whereas the non-support vector positive samples 422 may be pruned only if there is no room remaining in the cache besides the buffer. Furthermore, one or more non-support vector positive samples 422 (e.g., all non-support vector positive samples 422) may be pruned before any support vector sample 426 is pruned.

After pruning, weights (e.g., classifier model weights) may be updated. In accordance with the systems and methods disclosed herein, pruning may reduce memory usage and/or may reduce training time (possibly with a slightly lower accuracy, for example). It should be noted that the systems and methods disclosed herein (e.g., pruning) may be utilized in tracking and/or other applications. In particular, the systems and methods disclosed herein may be applied for a general purpose QP (e.g., SVM) solver that is efficient and flexible. For example, the systems and methods disclosed herein may be utilized in some applications besides tracking.

Figure 5:
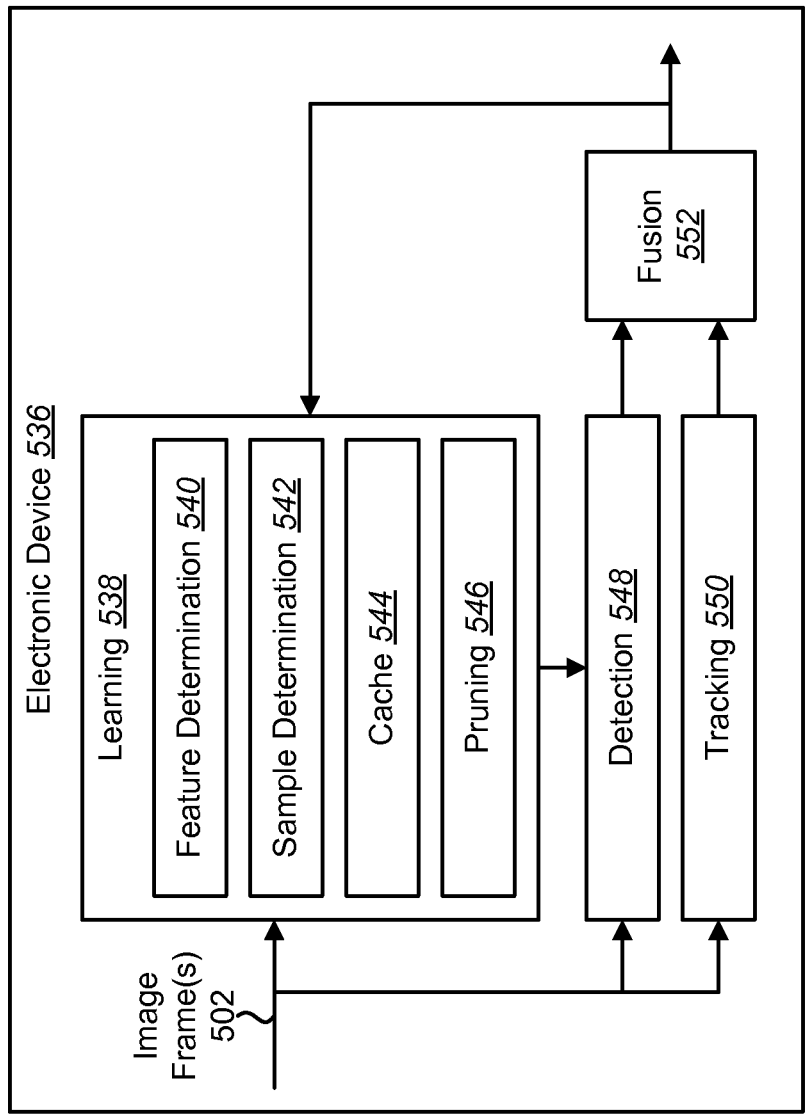
FIG. 5 is a block diagram illustrating one example of an electronic device in which systems and methods for object classification, for object detection and/or for memory management may be implemented.

FIG. 5 is a block diagram illustrating one example of an electronic device 536 in which systems and methods for object classification, for object detection and/or for memory management may be implemented. Examples of the electronic device 536 include smartphones, cellular phones, computers (e.g., desktop computers, laptop computers, etc.), tablet devices, media players, televisions, gaming consoles, personal digital assistants (PDAs), etc. The electronic device 536 may include a learning module 538, a detection module 548, a tracking module 550 and/or a fusion module 552. As used herein, a "module" may be implemented in hardware (e.g., circuitry) or a combination of hardware and software (e.g., a processor with instructions). It should be noted that one or more of the modules described in connection with FIG. 5 may be optional. Additionally or alternatively, one or more of the modules described in connection with FIG. 5 may be combined with one or more other modules and/or may be divided into separate modules.

The learning module 538 may learn a model for identifying an object in an image. For example, the learning module 538 may determine a classifier (e.g., decision boundary 118, 218, 418) that may be utilized to detect an object in an image. The learning module 538 may include a feature determination module 540, a sample determination module 542, a cache 544 and/or a pruning module 546. In some configurations, one or more of the feature determination module 540, the sample determination module 542, the cache 544 and the pruning module 546 may be separate from the learning module 538. Additionally or alternatively, one or more of the modules may be integrated into a single module.

The learning module 538 may obtain one or more image frames 502 (e.g., digital images, video, etc.). For example, the electronic device 536 may capture one or more image frames 502 (using an integrated and/or separate image sensor, for example) and/or may receive one or more image frames 502 from another device (e.g., a camera, a storage device, another electronic device, etc.). At least one of the image frames 502 may include an object. In some configurations, the electronic device 536 and/or learning module 538 may receive an indication of an object. For example, the electronic device 536 may receive an input (e.g., touch input, mouse click, selected bounding box, etc.) that indicates an area of an image frame 502 where the object is located.

The feature determination module 540 may determine (e.g., extract) features from an image frame 502. In some configurations, this may be accomplished as described above in connection with FIG. 1A. For example, the feature determination module 540 may determine a set of features, where each feature includes or corresponds to two or more pixels. The two or more pixels may be predetermined and/or may be selected randomly.

The sample determination module 542 may determine samples for each image frame 502. For example, the sample determination module 542 may determine whether each of the features results in a binary 1 or 0 for one or more scanning windows. For instance, each of the features may yield a 1 if a first pixel is greater in intensity than a second pixel or 0 otherwise. For instance, the sample determination module 542 may compare a first pixel to a second pixel. If the comparison satisfies one or more criteria (e.g., the first pixel is greater than the second pixel in intensity, the first pixel and the second pixel satisfy an intensity and/or color relationship (where the second pixel is within a threshold range of the first pixel or is outside a threshold range of the first pixel, for example)), the sample determination module 542 may set a corresponding value (e.g., bit) in a feature vector to a particular value (e.g., 1 or 0). Each set of features may accordingly yield a multidimensional feature vector. Each sample may represent a multidimensional feature vector. The sample determination module 542 may determine multiple samples corresponding to different windows (e.g., scanning windows) for the image frame 502. The windows may have different scales, sizes and/or locations.

For each image frame 502, the electronic device 536 (e.g., learning module 538) may add the samples to a training set. For example, the samples for each image frame 502 may be stored in the cache 544 as a training set. The learning module 538 may utilize the training set (and possibly other samples in the cache 544) to perform a training procedure (e.g., learning alpha values). In some configurations, the electronic device 536 (e.g., learning module 538) may add only support vector samples and incorrectly classified samples (e.g., hard samples) to the training set. For example, hard samples may be samples x with $y_i(w \cdot x_i - b) < 1$, which are incorrectly classified samples. In some configurations, only samples that meet this criterion (as determined by the electronic device 536, for example) may be added to the training set (in addition to support vector samples, for example).

The pruning module 546 may prune (e.g., remove) one or more samples from the training set to produce a pruned training set. This may be accomplished as described above in connection with FIG. 4. For example, the pruning module 546 may prune one or more (e.g., all) non-support vector negative samples from the training set after a training procedure (e.g., learning alpha values). Additionally or alternatively, the pruning module 546 may prune one or more non-support vector positive samples from the training set to avoid exceeding a sample number threshold. As described above in connection with FIG. 4, non-support vector positive samples may be pruned based on a random order, based on distance from the decision boundary and/or based on age. Additionally or alternatively, the pruning module 546 may prune one or more support vector samples from the training set to avoid exceeding a sample number threshold. As described above in connection with FIG. 4, support vector samples may be pruned based on a random order, based on an alpha value and/or based on age. In some configurations, the one or more non-support vector negative samples may be pruned first, the one or more non-support vector positive samples may be pruned second and the one or more support vector samples may be pruned third. For example, the one or more non-support vector positive samples may be pruned only after pruning all of the non-support vector negative samples if necessary to avoid exceeding the sample number threshold. Furthermore, the one or more support vector samples may be pruned only after pruning one or more (e.g., all) non-support vector positive samples if needed to avoid exceeding the sample number threshold. For example, one or more support vector samples may only be pruned once all of the non-support vector positive samples have been removed from the training set for the current frame and/or the entire cache 544.

The electronic device 536 may manage memory. For example, the electronic device 536 (e.g., learning module 538) may determine samples for a current image frame 502, where each of the samples represents a multidimensional feature vector as described above. The electronic device 536 (e.g., learning module 538) may store the samples in the cache 544. The electronic device 536 (e.g., learning module 538) may perform classifier training based on the samples. The electronic device 536 (e.g., learning module 538) may prune one or more samples from the cache 544 after a training procedure (e.g., after learning alpha values). Pruning the one or more samples may limit (e.g., lower) memory usage growth for one or more subsequent image frames 502. For example, pruning the samples as described herein may lower memory usage growth in comparison to an approach without pruning. Specifically, memory usage may grow at a lower rate when pruning because fewer samples (e.g., less than all) are being stored to the cache. Furthermore, pruning in accordance with the systems and methods disclosed herein may place an upper limit or ceiling on the possible amount of memory that may be utilized. As described in the example above, a cache may include up to 20,000 samples, including 1,000 samples in a buffer. Therefore, the memory usage may not grow beyond 20,000 samples maximum in that example. Additionally or alternatively, pruning the one or more samples may reduce training time for one or more subsequent image frames 502. It should be noted that the classifier accuracy may not be reduced in comparison to a decision forest approach in some configurations.

In some configurations, the electronic device 536 (e.g., learning module 538) may determine feature vectors with associated weights for each image frame 502. The electronic device 536 (e.g., learning module 538, feature determination module 540, etc.) may reduce the feature vectors based on the associated weights to produce reduced feature vectors. An object in the image frame 502 may be detected based on the reduced feature vectors. For example, the electronic device 536 (e.g., learning module 538) may order the feature vectors based on the associated weights. Reducing the feature vectors may include removing one or more of the feature vectors with the smallest weights. Additional detail is given in connection with FIGS. 11-13.

The detection module 548 may detect an object in the image frame(s) 502 based on the learning. For example, the detection module 548 may detect an object in the image frame(s) 502 based on the classifier model (e.g., decision boundary) determined by the learning module 538. In some configurations, the detection module 548 may compare one or more samples from one or more scanning windows to the decision boundary. If a sample is on a positive side of the decision boundary (e.g., if $w \cdot x_i - b > 1$), the detection module 548 may indicate that the object is detected at that scanning window position.

The tracking module 550 may track the object in the image frame(s) 502. For example, the tracking module 550 may track the object in a series of image frames 502. In some configurations, the tracking module 550 may track the object in a subsequent image frame 502 based on the detected location of the object as provided by the detection module 548. For example, the tracking module 550 may search a reduced area of a subsequent image frame 502 based on based on the detected location of the object in the previous image frame 502.

The fusion module 552 may combine the window positions from the detection module and the window position from the tracking module into one final window position. For example, the final position may be the average or weighted average of the positions provided by detection and tracking. More detailed examples of the learning module 538, detection module 548, tracking module 550 and/or fusion module 552 are given in connection with FIG. 14.

Figure 6:
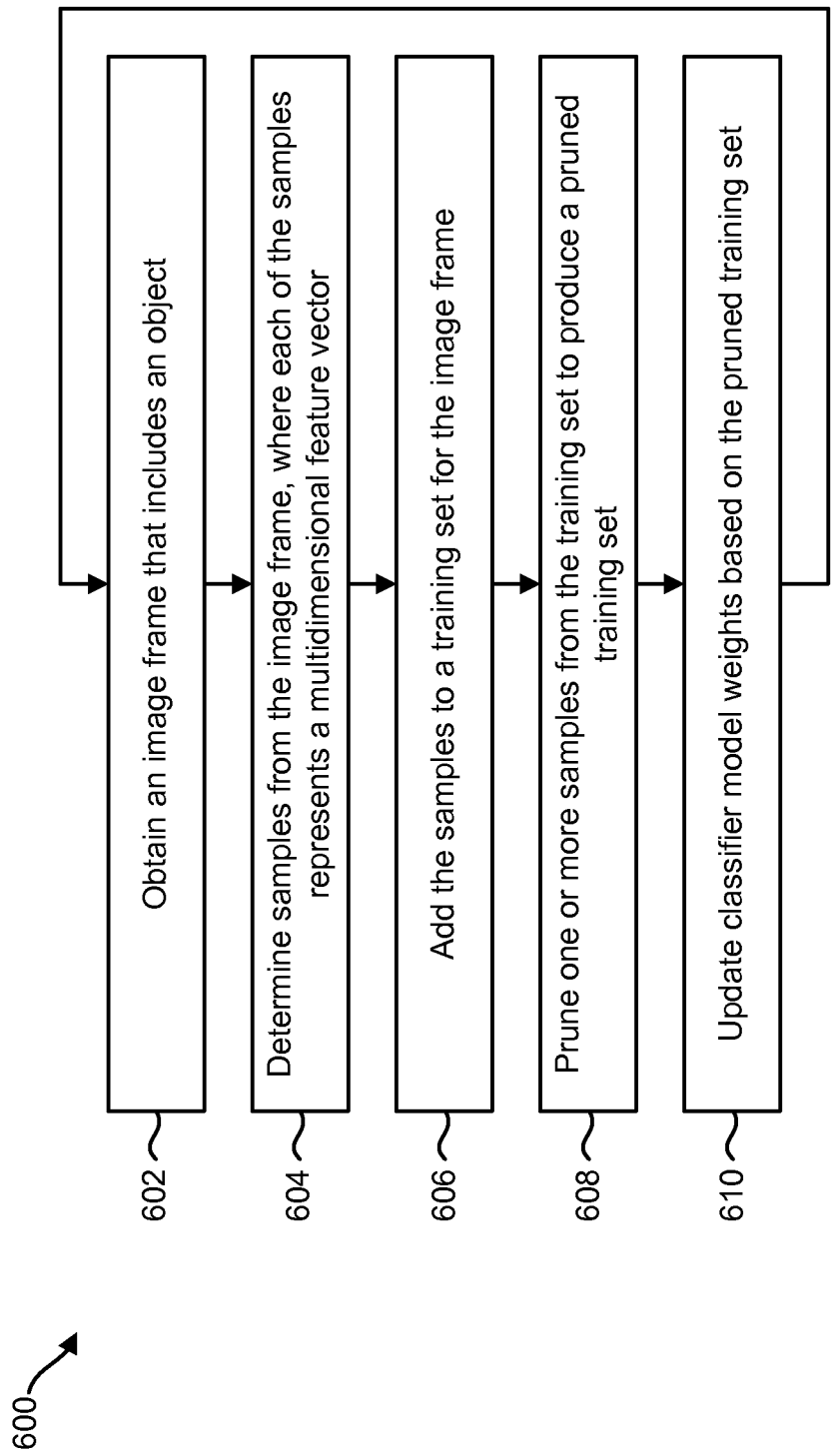
FIG. 6 is a flow diagram illustrating one configuration of a method for object classification.

FIG. 6 is a flow diagram illustrating one configuration of a method 600 for object classification. The electronic device 536 described in connection with FIG. 5 may perform the method 600, for example. The electronic device 536 may obtain 602 an image frame. For example, the electronic device 536 may obtain 602 one or more image frames (e.g., a sequence of image frames, video, etc.). This may be accomplished as described above in connection with FIG. 5.

The electronic device 536 may determine 604 samples from the image frame 502, where each of the samples represents a multidimensional feature vector. This may be accomplished as described above in connection with one or more of FIGS. 1 and 5.

The electronic device 536 may add 606 the samples to a training set for the image frame 502. This may be accomplished as described above in connection with FIG. 5. For example, the electronic device 536 may add one or more of the samples determined for an image frame 502 to the training set. In some configurations, the electronic device 536 may add only support vector samples and incorrectly classified samples (e.g., hard samples) to the training set. The training set may be stored in the cache 544.

The electronic device 536 may prune 608 one or more samples from the training set to produce a pruned training set. This may be accomplished as described above in connection with one or more of FIGS. 4-5. For example, the electronic device 536 may prune one or more non-support vector negative samples from the training set (after a training procedure, e.g., learning alpha values), may prune one or more non-support vector positive samples from the training set if necessary to avoid exceeding a sample number threshold and/or may prune one or more support vector samples from the training set if necessary to avoid exceeding a sample number threshold. This may be done in accordance with one or more of the priorities, orders and/or schemes described above.

The electronic device 536 may update 610 classifier model weights based on the pruned training set. For example, the electronic device 536 may update the classifier model (e.g., decision boundary) with the weights determined based on the pruned training set. In some configurations, the classifier model weights (e.g., w) may be updated by applying learned alpha values. As described above, alpha values may be learned by maximizing Equation (3) based on training samples (e.g., an initial training set on the first iteration or a pruned training set on subsequent iterations). The weights may be updated 610 by applying the learned alpha values in accordance with Equation (4), for example. Once the weights are updated, the model may be faster and more capable of detecting the target correctly. It should be noted that one or more procedures of the method 600 may be repeated for one or more subsequent frames (in one or more iterations, for example).

As illustrated in FIG. 6, the method 600 may be repeated (e.g., looped). For example, the method 600 may be repeated for each image frame in a series of image frames. It should be noted that updating 610 classifier model weights may be referred to as a training procedure in some configurations. For example, learning alpha values may be one training procedure and updating classifier model weights may be another training procedure. On an initial iteration (e.g., loop), one training procedure may be performed before pruning the training set. For example, the electronic device 536 may learn alpha values from an initial training set before pruning. After pruning 608 the training set on the first iteration, the model weights may be updated 610 based on the pruned training set. In one or more subsequent iterations, learning alpha values may be based on the pruned training set, where the pruned training set include samples remaining after pruning from a previous frame with the newly added samples corresponding to the current frame. For example, the electronic device 536 may add 606 samples to the pruned training set. Learning alpha values may be based on the pruned training set, which may include newly added samples corresponding to the current frame. The pruned training set may be pruned further, and the weights may be updated 610 based on the further pruned training set (and the alpha values, for example). Accordingly, some configurations of the systems and methods disclosed herein may repeatedly train and prune.

Figure 7:
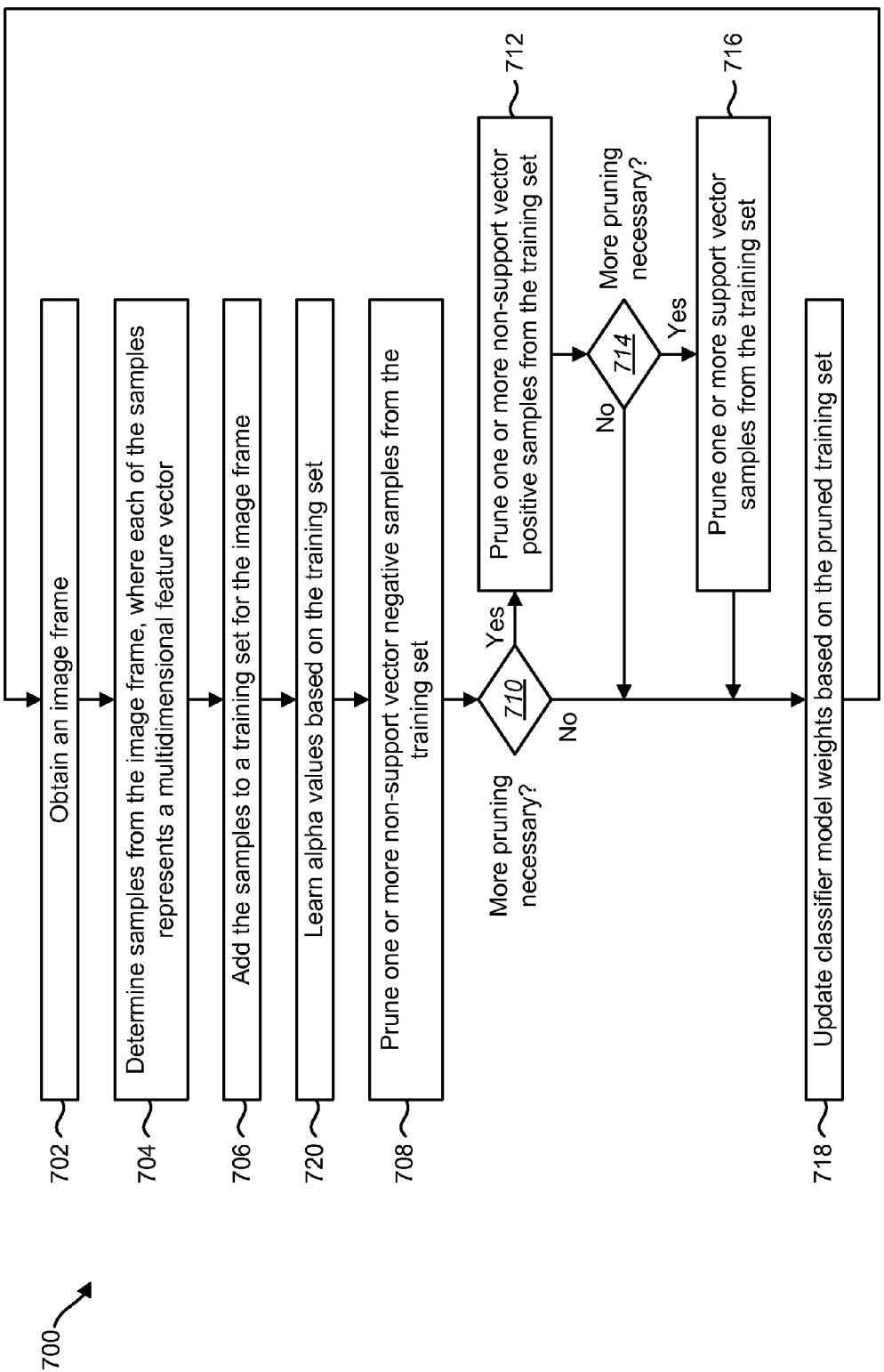
FIG. 7 is a flow diagram illustrating a more specific configuration of a method for object classification.

FIG. 7 is a flow diagram illustrating a more specific configuration of a method 700 for object classification. The electronic device 536 described in connection with FIG. 5 may perform the method 700, for example. The electronic device 536 may obtain 702 an image frame. For example, the electronic device 536 may obtain 702 one or more image frames (e.g., a sequence of image frames, video, etc.). This may be accomplished as described above in connection with one or more of FIGS. 5-6.

The electronic device 536 may determine 704 samples from the image frame 502, where each of the samples represents a multidimensional feature vector. This may be accomplished as described above in connection with one or more of FIGS. 1 and 5-6.

The electronic device 536 may add 706 the samples to a training set for the image frame 502. This may be accomplished as described above in connection with one or more of FIGS. 5-6. For example, the electronic device 536 may add one or more of the samples determined for an image frame 502 to the training set. In some configurations, the electronic device 536 may add only support vector samples and incorrectly classified samples (e.g., hard samples) to the training set. The training set may be stored in the cache 544.

The electronic device 536 may learn 720 alpha values based on the training set. For example, the electronic device 536 may learn 720 alpha values by maximizing a function of alpha values. For instance, learning 720 the alpha values may be based on sample vectors (e.g., a kernel function of sample vectors), multipliers (e.g., Legrange multipliers) and/or one or more class indicators. In some configurations, learning 720 alpha values may be performed by maximizing Equation (3). On an initial iteration (e.g., loop), the electronic device 536 may learn alpha values from an initial training set before pruning. For example, learning 720 alpha values may be based on a non-pruned training set in an initial iteration. In one or more subsequent iterations, learning 720 alpha values may be based on the pruned training set, where the pruned training set include samples remaining after pruning from a previous frame with the newly added samples corresponding to the current frame. Learning 720 the alpha values may be performed once per iteration or loop.

The electronic device 536 may prune 708 one or more non-support vector negative samples from the training set. This pruning 708 (e.g., removal, deletion, etc.) may be performed after training. In some configurations, the electronic device 536 may prune 708 one or more of the non-support vector negative samples from the training set as necessary to avoid exceeding a sample number threshold. For example, a number of non-support vector negative samples may be pruned such that the number of remaining samples in the cache is equal to the sample number threshold or less than the sample number threshold, if possible (e.g., if enough non-support vector negative samples are in the training set to be pruned down to the sample number threshold). In other configurations, the electronic device 536 may prune 708 all of the non-support vector negative samples.

The electronic device 536 may determine 710 whether more pruning is necessary. More pruning may be necessary in a case that the training set and/or cache 544 include more samples than the sample number threshold. For example, the electronic device 536 may compare the number of samples (e.g., samples remaining after pruning 708 the one or more non-support vector negative samples) in the training set and/or cache 544 to the sample number threshold. If the number of samples in the training set and/or cache 544 is greater than the sample number threshold (or greater than or equal to the sample number threshold in some configurations), the electronic device 536 may determine 710 that more pruning is necessary.

In a case that more pruning is not necessary, the electronic device 536 may update 718 classifier model weights based on the pruned training set. In some configurations, updating 718 the classifier model weights may be accomplished as described in connection with FIG. 6. In some configurations, updating 718 the classifier model weights may be based on alpha values (e.g., Legrange multipliers), class indicators and/or the pruned training set (e.g., samples remaining after pruning). For instance, updating 718 the classifier model weights may be performed in accordance with Equation (4). Updating 718 the classifier model weights may be performed once per iteration or loop. The electronic device 536 may update the classifier model (e.g., decision boundary) with the weights determined based on the pruned training set.

In a case that more pruning is necessary, the electronic device 536 may prune 712 one or more non-support vector positive samples from the training set. This may be accomplished as described above in connection with one or more of FIGS. 4-6. In particular, one or more non-support vector positive samples may be pruned 712 as necessary to avoid exceeding a sample number threshold.

In some approaches, only a number of non-support vector positive samples may be pruned sufficient to reduce the number of samples in the cache to equal the sample number threshold or to be less than the sample number threshold. In some configurations, selecting one or more of the non-support vector positive samples for pruning may be accomplished in accordance with one or more schemes. In one example, the one or more non-support vector positive samples may be selected at random. In other examples, the electronic device 536 may order the one or more non-support vector positive samples based on distances to the decision boundary, based on ages or both. The non-support vector positive samples may then be pruned 712 in accordance with the order. For instance, non-support vector positive samples that are furthest from the boundary, that are the oldest, or that are more highly prioritized for pruning based on a weighted combination of both may be pruned first.

The electronic device 536 may determine 714 whether more pruning is necessary. More pruning may be necessary in a case that the training set and/or cache 544 include more samples than the sample number threshold. For example, the electronic device 536 may compare the number of samples (e.g., samples remaining after pruning 708 the one or more (e.g., all) non-support vector negative samples and after pruning 712 the one or more (e.g., all) non-support vector positive samples) in the training set and/or cache 544 to the sample number threshold. If the number of samples in the training set and/or cache 544 is greater than the sample number threshold (or greater than or equal to the sample number threshold in some configurations), the electronic device 536 may determine 714 that more pruning is necessary.

In a case that more pruning is not necessary, the electronic device 536 may update 718 classifier model weights based on the pruned training set. In a case that more pruning is necessary, the electronic device 536 may prune 716 one or more support vector samples from the training set. This may be accomplished as described above in connection with one or more of FIGS. 4-6. In particular, one or more support vector samples may be pruned 716 as necessary to avoid exceeding a sample number threshold.

In some approaches, only a number of support vector samples may be pruned sufficient to reduce the number of samples in the cache to equal the sample number threshold or to be less than the sample number threshold. In some configurations, selecting one or more of the support vector samples for pruning may be accomplished in accordance with one or more schemes. In one example, the one or more support vector samples may be selected at random. In other examples, the electronic device 536 may order the one or more support vector samples based on alpha values, based on ages or both. The support vector samples may then be pruned 716 in accordance with the order. For instance, support vector samples that have the smallest alpha values (e.g., that are associated with the smallest alpha values), that are the oldest, or that are more highly prioritized for pruning based on a weighted combination of both may be pruned first. As described in connection with the example in FIG. 7, the non-support vector negative samples may be pruned at a highest priority (e.g., first), followed by the non-support vector positive samples as necessary and followed by the support vector samples as necessary. The electronic device 536 may update 718 classifier model weights based on the pruned training set. It should be noted that one or more procedures of the method 700 may be repeated for one or more subsequent frames (in one or more iterations, for example).

Figure 8:
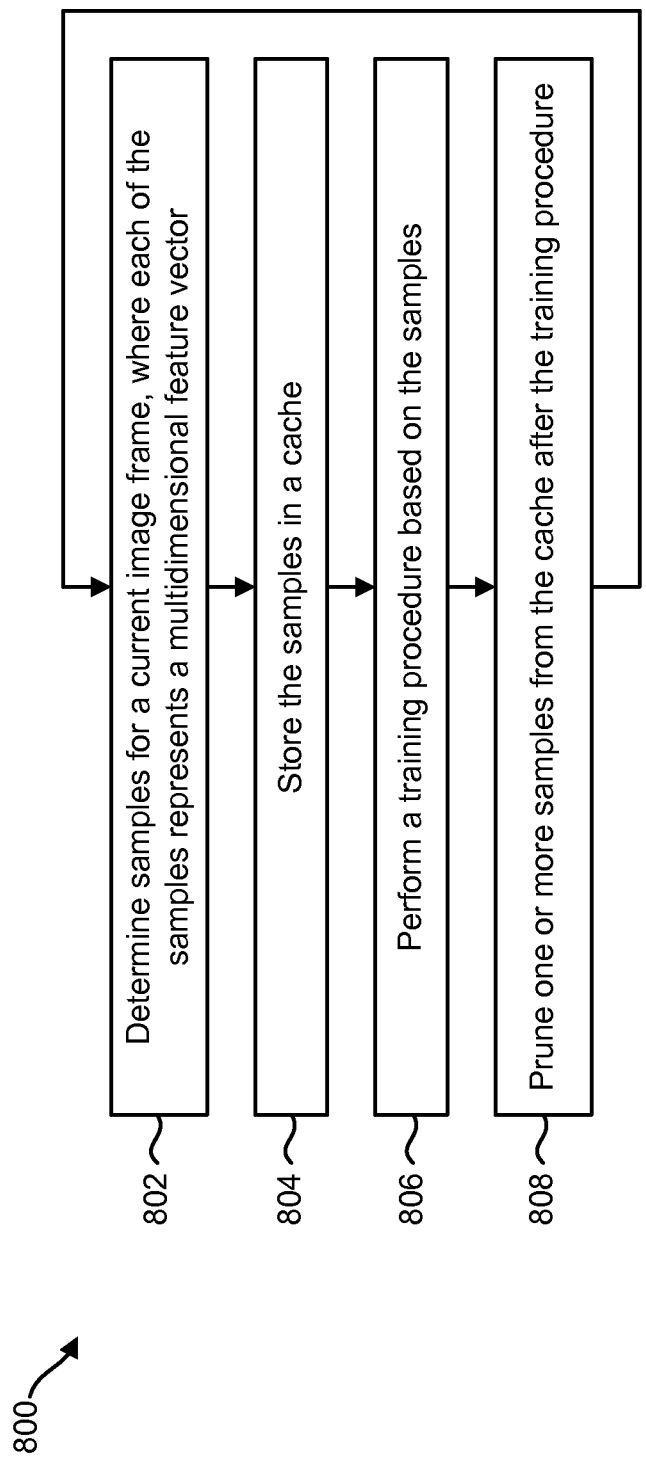
FIG. 8 is a flow diagram illustrating one configuration of a method for memory management.

FIG. 8 is a flow diagram illustrating one configuration of a method 800 for memory management. The method 800 may be performed by the electronic device 536 described in connection with FIG. 5. One or more of the procedures of the method 800 described in connection with FIG. 8 may be performed in conjunction with, or separately from one or more of the procedures described in connection with FIGS. 4-7. The electronic device 536 may determine 802 samples for a current image frame 502, where each of the samples represents a multidimensional feature vector. This may be accomplished as described in connection with one or more of FIGS. 1 and 5-7.

The electronic device 536 may store 804 samples in a cache 544. This may be accomplished as described above in connection with one or more of FIGS. 5-7. For example, the electronic device 536 may store a training set of samples in the cache 544. In some configurations, the electronic device 536 may only store support vector samples and incorrectly classified samples (e.g., hard samples). Initially, for example, the electronic device 536 may store all of the support vector samples and incorrectly classified samples including negative samples and positive samples. Support vectors may be $x_i$ with $y_i(w \cdot x_i - b) = 1$. Hard samples may be $x_i$ with $y_i(w \cdot x_i - b) < 1$, which are the incorrectly classified samples. Accordingly, hard samples are not support vectors.

The cache 544 may be implemented in a processor cache (e.g., L1 cache, L2 cache, etc.), as part of a processor cache or as a combination of processor caches (e.g., L1 cache and L2 cache, etc.). Alternatively, the cache 544 may be implemented in Random Access Memory (RAM) and/or another storage location. Storing 804 the samples may include writing sample data at one or more addresses (e.g., one or more ranges of addresses) that pertain to the cache. For example, the cache 544 may include one or more addresses (e.g., one or more ranges of addresses). In some configurations, the electronic device 536 may avoid overwriting one or more cache addresses that contain one or more samples that have not been removed. For example, the electronic device 536 may track which addresses include samples that have been removed and/or samples that have not been removed.

The electronic device 536 may perform 806 a training procedure based on the samples. For example, the electronic device 536 may learn alpha values based on the samples. In some configurations, this may be accomplished as described in connection with one or more of FIGS. 2-7.

The electronic device 536 may prune 808 one or more samples from the cache 544 after the training procedure. This may be accomplished as described in connection with one or more of FIGS. 4-7. For example, the electronic device 536 may prune 808 (e.g., remove, delete) one or more samples in accordance with the procedures, priorities and/or orderings described in connection with one or more of FIGS. 4-6. Pruning 808 the one or more samples from the cache 544 may include marking and/or tracking one or more cache 544 addresses as no longer including sample(s) and/or as overwritable. Pruning 808 the one or more samples may be beneficial by lowering memory usage growth (over one or more image frames 502, for example) and/or by reduce training time (over one or more image frames 502, for example). The remaining samples may be utilized to update weights (e.g., determine a decision boundary in accordance with an SVM approach). It should be noted that one or more procedures of the method 800 may be repeated for one or more subsequent frames (in one or more iterations, for example).

Figure 9:
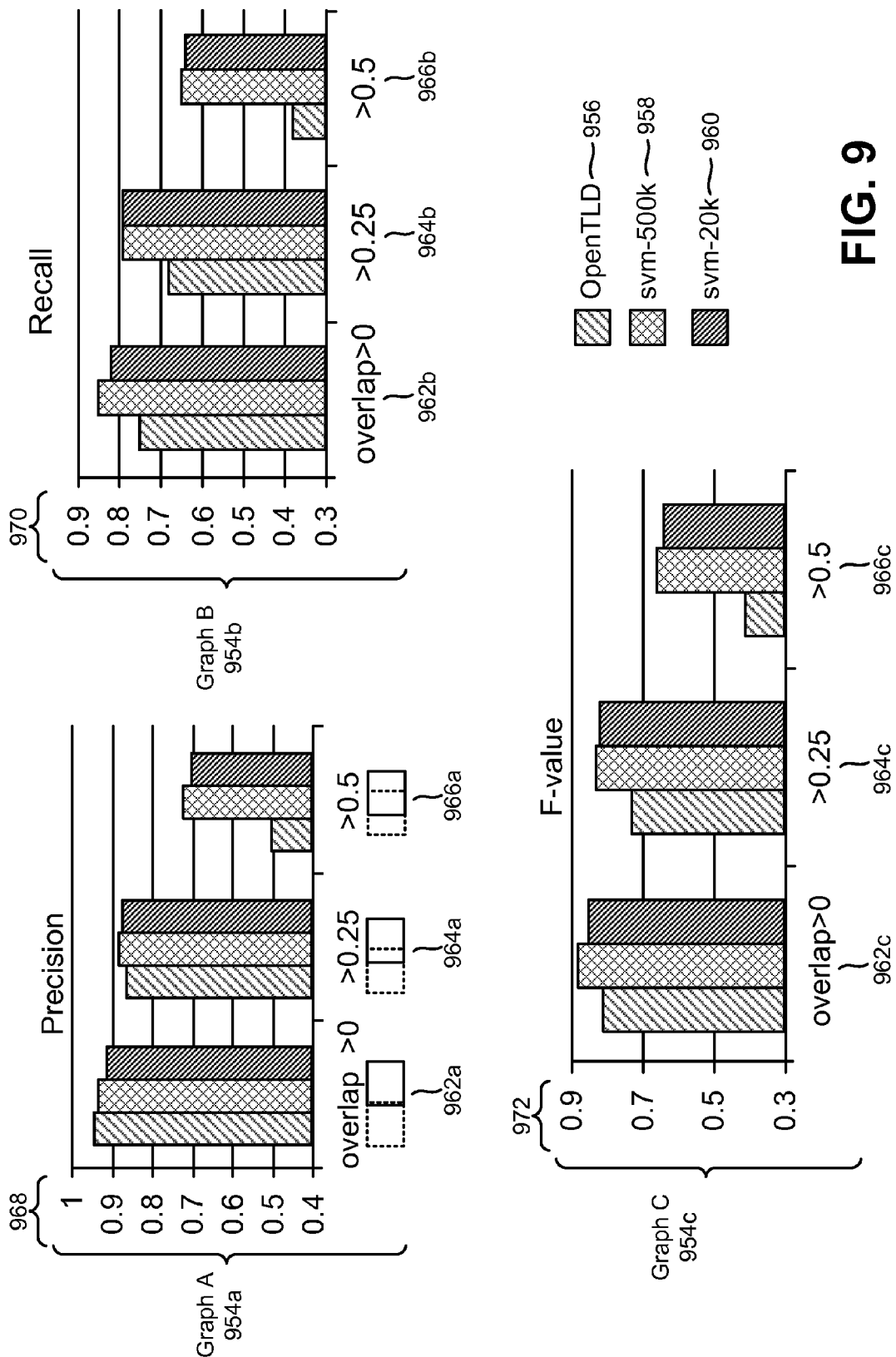
FIG. 9 illustrates comparison results between the approaches of the systems and methods disclosed herein and other approaches.

FIG. 9 illustrates comparison results between the approaches of the systems and methods disclosed herein and other approaches. In particular, FIG. 9 illustrates a comparison between a decision forest approach (e.g., OpenTLD 956), SVM without pruning (e.g., SVM-500 k 958) and SVM with pruning (e.g., SVM-20 k 960). Three graphs are illustrated in FIG. 9. Graph A 954*a* illustrates precision, graph B 954*b* illustrates recall and graph C 954*c* illustrates F-value. Each of the graphs 954*a-c* includes three groups of bars, where each group of bars corresponds to different overlap criteria used in measurement. Specifically, "overlap>0" 962*a-c* means that any overlap between a bounding box (e.g., detection bounding box or tracking bounding box determined in accordance with the method used, such as OpenTLD, SVM-500 k or SVM-20 k) and the object for a frame is counted as valid detection/tracking. "Overlap>0.25" 964*a-c* means that greater than 25% overlap between a bounding box and the object for a frame is counted as valid detection/tracking. "Overlap>0.5" 966*a-c* means that greater than 50% overlap between a bounding box and the object for a frame is counted as valid detection/tracking.

The vertical axis of precision graph A 954*a* indicates a measure of precision 968. Precision is a measure of how many frames are correctly tracked. Specifically, precision may be defined as a number of frames in which the object actually appeared divided by a number of frames in which the object was tracked. For example, if 70 out of 100 frames actually include an object but 90 frames were detected as including the object, then the precision is 70/90. As can be observed, precision for the SVM approaches 958, 960 is better than precision for the OpenTLD approach 956 when greater than 25% or 50% overlap is required. Furthermore, precision for the SVM-20 k approach 960 is nearly as good as the SVM-500 k (e.g., non-pruning) approach 958.

The vertical axis of recall graph B 954*b* indicates a measure of recall 970. Recall is another measure of how many frames are correctly tracked. Specifically, recall may be defined as a number of frames in which the object was tracked divided by a number of frames in which the object actually appeared. For example, if 80 out of 100 frames actually include an object (e.g., the object was occluded in 20 frames) but 70 frames were detected as including the object, then the recall is 70/80. As can be observed, recall for the SVM approaches 958, 960 is better than recall for the OpenTLD approach 956. Furthermore, recall for the SVM-20 k approach 960 is nearly as good as the SVM-500 k (e.g., non-pruning) approach 958.

The vertical axis of F-value graph C 954*c* indicates a measure of the F-value 972. The F-value is a combination measure of how many frames are correctly tracked. Specifically, the F-value may be defined as the product of precision and recall divided by the sum of precision and recall. As can be observed, the F-value for the SVM approaches 958, 960 is better than the F-value for the OpenTLD approach 956. Furthermore, the F-value for the SVM-20 k approach 960 is nearly as good as the SVM-500 k (e.g., non-pruning) approach 958.

Accordingly, FIG. 9 illustrates a comparison between different SVM sample cache sizes (500 k vs 20 k), where only slight differences are illustrated. The left-most bars in each group of bars illustrate the performance of the decision forest approach (e.g., OpenTLD 956). The middle bars in each set of bars illustrate the performance of the SVM approach without pruning 958 (e.g., with a large cache size of 500,000 samples). The right-most bars in each set of bars illustrate the performance of the SVM approach in accordance with the systems and methods disclosed herein with a smaller cache size 960 (e.g., 20,000 samples). In this example, the graphs 954*a-c* illustrate precision, recall and F-value on 22 test sequences.

Figure 10:
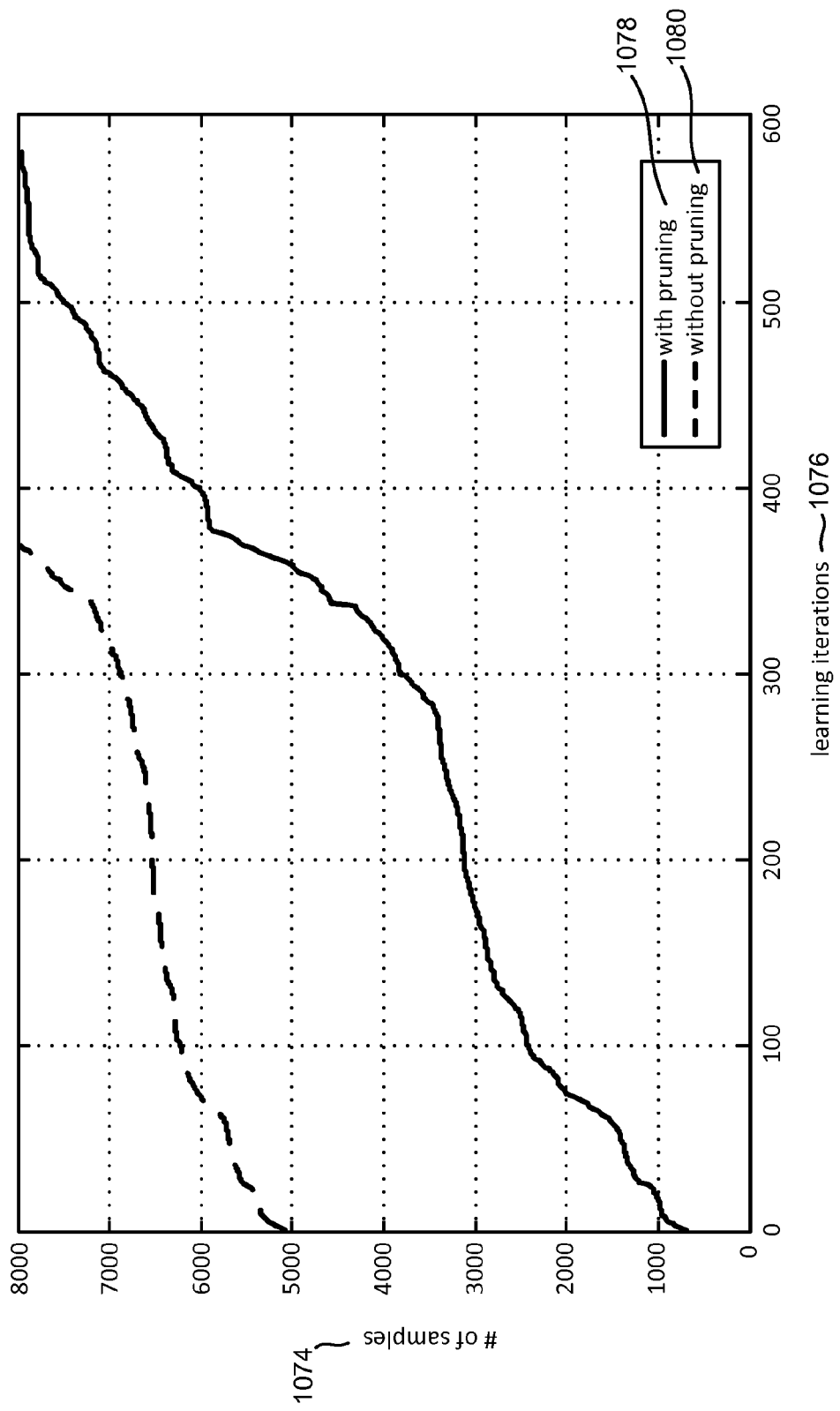
FIG. 10 is a graph illustrating a comparison of learning samples.

FIG. 10 is a graph illustrating a comparison of learning samples. The vertical axis is illustrated in a number of samples 1074 and the horizontal axis is illustrated in a number of learning iterations 1076. In particular, the upper dashed line illustrates the number of samples in a cache without pruning 1080 over a number of iterations (e.g., image frames). The lower solid line illustrates the number of samples in a cache with pruning 1078. As can be observed, pruning in accordance with the systems and methods disclosed herein significantly reduces (e.g., limits) the number of stored samples and/or the growth of samples stored in the cache over a number of iterations. This allows object online classification, detection and/or tracking to be implemented more easily in memory-constrained scenarios (e.g., in mobile devices with less memory available and/or less processing power). It should also be noted that the systems and methods disclosed herein may place an upper limit on the number of samples. For example, assuming a cache size of 20,000 samples, the cache will be limited to no more than 20,000 samples, while other approaches would allow the cache to continue growing.

Figure 11:
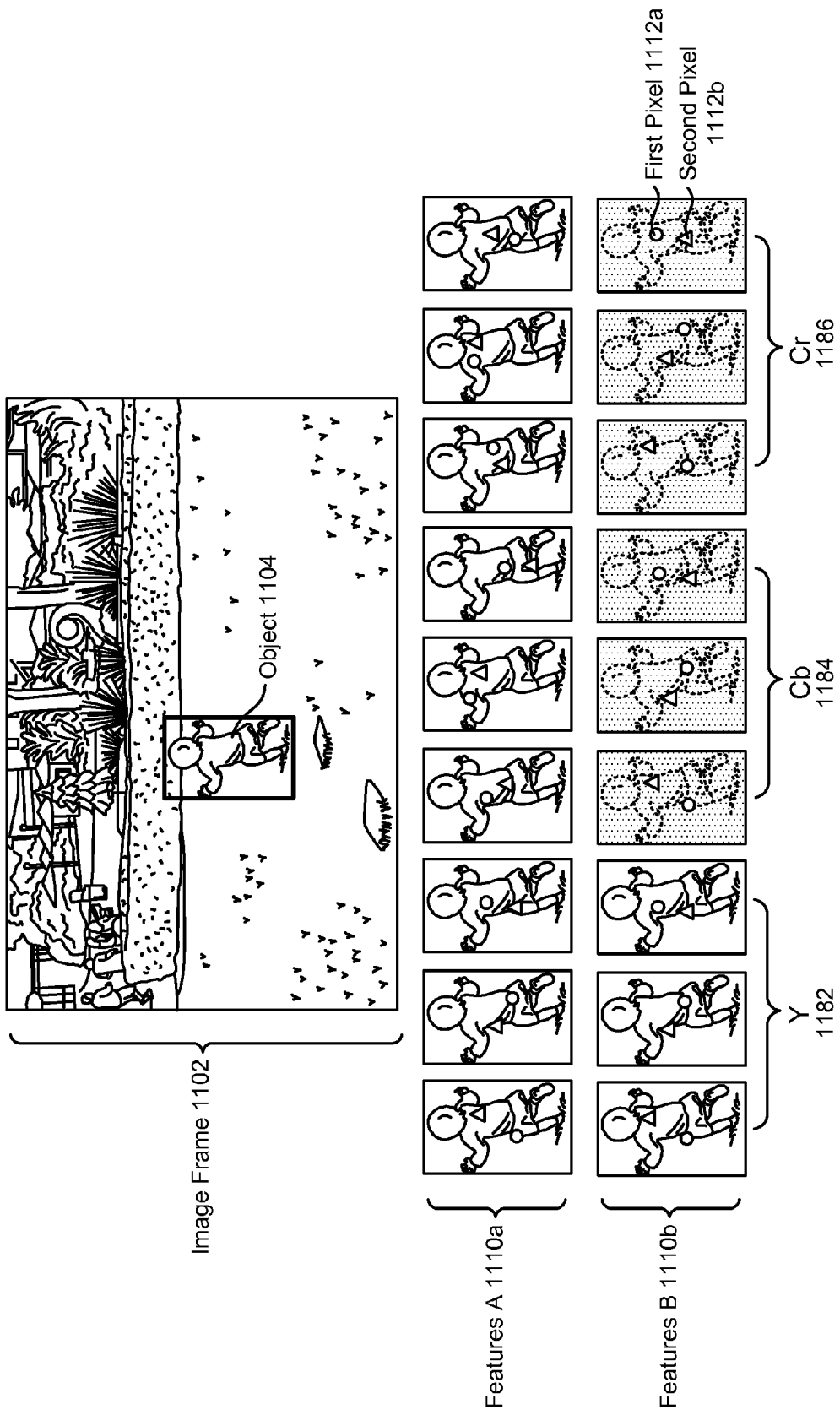
FIG. 11 illustrates an approach for reducing feature vectors in accordance with the systems and methods disclosed herein.

FIG. 11 illustrates an approach for reducing feature vectors in accordance with the systems and methods disclosed herein. In particular, FIG. 11 illustrates an example of using color features. An image frame 1102 is illustrated, including an object 1104 (e.g., a child) for detection and/or tracking. Features 1110 may be extracted from the image frame 1102. Instead of using only features A 1110*a* based on gray images (e.g., grayscale, intensity, etc.), features B 1110*b* may be extended to include YCbCr color spaces (e.g., luminance Y 1182, blue-difference chroma Cb 1184 and red-difference chroma Cr 1186). As described in connection with FIG. 1A, a first pixel 1112*a* may be compared to a second pixel 1112*b* to determine a feature vector.

Even when extending the features to include color spaces, the feature length may be maintained or reduced in accordance with the systems and methods disclosed herein. Specifically, the image frame 1102 illustrates an image for detection/tracking. The top row of gray images under the image provides an example of features A 1110*a* based on gray (e.g., grayscale, intensity, etc.): 9 different pairs of pixels on the gray scale images. Accordingly, this has a feature length of 9. The bottom row of images provides an example of features B 1110*b* based on the YCbCr color space, with 3 different pairs of pixels on 3 channels. Accordingly, this also has a feature length of 9.

Figure 12:
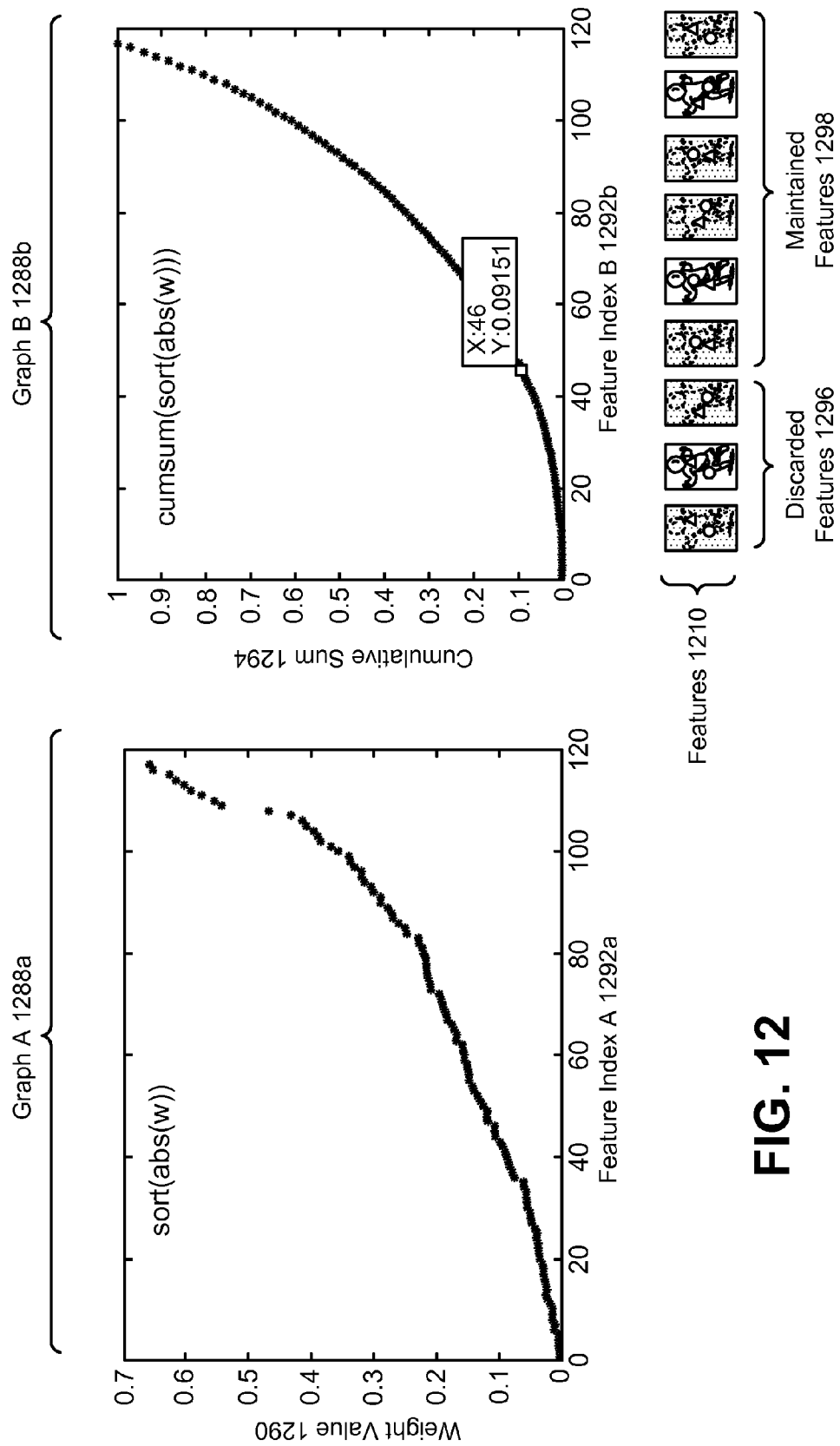
FIG. 12 illustrates another example of feature selection in accordance with the systems and methods disclosed herein.

FIG. 12 illustrates another example of feature selection in accordance with the systems and methods disclosed herein. In particular, FIG. 12 illustrates feature selection for efficient detection. A classification score may be w x, which is an inner product of weights w and feature vector x. Since x is a binary vector (including 0/1 values, for example), feature importance is represented by the absolute value of w. Accordingly, feature selection may be carried out based on weight w.

Specifically, FIG. 12 illustrates graph A 1288a and graph B 1288b. Graph A 1288a illustrates an example of sorted weights (e.g. sorted absolute value of weights or sort(abs (w))) associated with (e.g., corresponding to) features. The vertical axis of graph A 1288a illustrates weight value 1290 and the horizontal axis of graph A 1288a illustrates feature index A 1292a. Graph B 1288b illustrates an example of cumulative sums of sorted weights (e.g. cumulative sums of sorted absolute value of weights or cumsum(sort(abs(w)))) associated with (e.g., corresponding to) features. The vertical axis of graph B 1288b illustrates the cumulative sum 1294 and the horizontal axis of graph B 1288b illustrates feature index B 1292b.

In accordance with some configurations of the systems and methods disclosed herein, an electronic device (e.g., the electronic device 536 described in connection with FIG. 5) may reduce the features (e.g., feature vectors) based on their associated weights. For example, FIG. 12 illustrates a set of features 1210 may be discarded 1296, while some of the features 1210 may be maintained 1298. For instance, feature pairs may be reduced from about 120 to about 80, while keeping 90 percent or more (e.g., 90%+) energy. In one example, precision with reduced feature vectors may be 0.989 in comparison to 0.993 without reduction. Recall with reduced feature vectors may be 0.957 in comparison to 0.962 without reduction. It should be noted that another advantage of using linear SVM is the natural feature selection.

Figure 13:
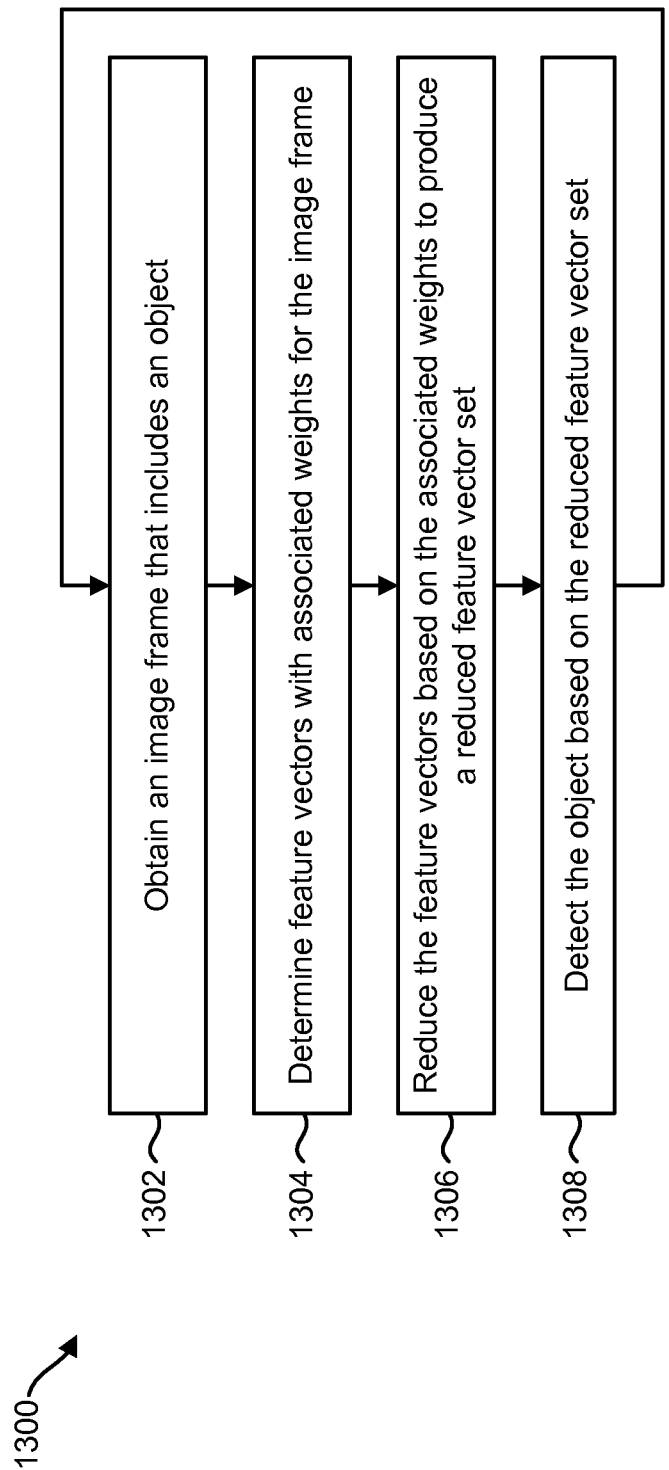
FIG. 13 is a flow diagram illustrating one configuration of a method for object detection.

FIG. 13 is a flow diagram illustrating one configuration of a method 1300 for object detection. The method 1300 may be performed by the electronic device 536 described in connection with FIG. 5. The electronic device 536 may obtain 1302 an image frame 502 that includes an object. This may be accomplished as described above in connection with FIG. 5.

The electronic device 536 may determine 1304 feature vectors (e.g., samples) with associated weights for the image frame 502. The feature vectors may be a set of feature vectors corresponding to the features for a frame. Determining 1304 feature vectors may be accomplished as described above in connection with one or more of FIGS. 1-8 and 11-12. For example, the electronic device 536 may determine feature vectors by comparing two pixels (in a scanning window, for example) for each feature in a set of features and setting an element of the feature vector to 1 or 0 based on the comparison. In some configurations, the weight associated with each feature vector may be determined in accordance with the approach represented in Equations (3)-(4), for two or more dimensions.

The electronic device 536 may reduce 1306 the feature vectors based on the associated weights to produce a reduced feature vector set (e.g., a reduced set of feature vectors). This may be accomplished as described above in connection with one or more of FIGS. 5 and 11-12. For example, the electronic device 536 may order the feature vectors based on the associated weights. Reducing 1306 the feature vectors may include removing one or more of the feature vectors with smallest weights. For example, the electronic device 536 may remove a particular number and/or a proportion of the feature vectors. For example, the electronic device 536 may remove approximately a third of feature vectors with the smallest weights. Additionally or alternatively, the electronic device 536 may remove feature vectors with weights smaller than a particular threshold weight value.

In some configurations, the electronic device 536 may detect 1308 the object based on the reduced feature vector set. This may be accomplished as described above in connection with one or more of FIGS. 1, 5 and 11-12. It should be noted that one or more of the procedures, functions, steps, etc., described in connection with FIGS. 6-8 and 13 may be combined and/or rearranged. For example, the method 1300 described in connection with FIG. 13 may be combined with one or more of the methods 600-800 described in connection with one or more of FIGS. 6-8. For example, the feature vector set (e.g., the samples) may be reduced 1306 in accordance with the approach described in connection with FIGS. 5, 11-13 (e.g., based on associated weights) in addition to the pruning described in connection with FIGS. 4-8. It should be noted that one or more procedures of the method 1300 may be repeated for one or more subsequent frames (in one or more iterations, for example). In some configurations, the reduction 1306 may be performed at each iteration (e.g., at each frame). In other configurations, the reduction 1306 may be performed once for a number of frames (e.g., once every 10 frames).

Figure 14:
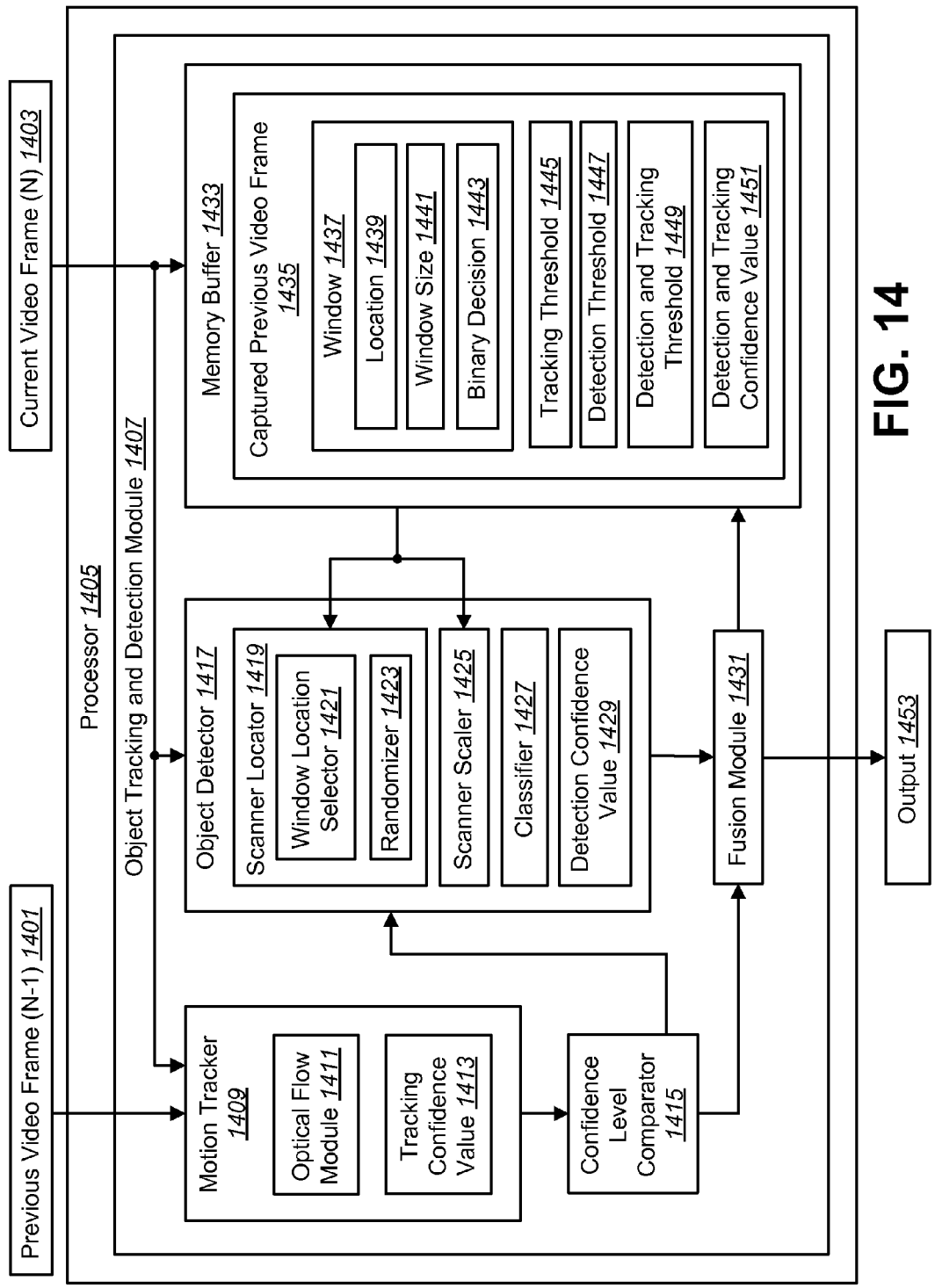
FIG. 14 is a block diagram illustrating an object tracking and detection module.

FIG. 14 is a block diagram illustrating an object tracking and detection module 1407. The object tracking and detection module 1407 may be implemented within an electronic or wireless device. For example, the object tracking and detection module 1407 may provide examples of one or more of the modules described in connection with FIG. 5. Additionally or alternatively, the electronic device 536 of FIG. 5 may be implemented in accordance with one or more of the elements described in connection with FIG. 14. The object tracking and detection module 1407 may include a motion tracker 1409 having an optical flow module 1411 and a tracking confidence value 1413. The object tracking and detection module 1407 may also include an object detector 1417 having a scanner locator 1419, scanner scaler 1425, classifier 1427 and a detection confidence value 1429. The memory buffer 1433 may store data associated with a captured previous video frame 1435 that may be provided to the motion tracker 1409 and object detector 1417. The motion tracker 1409, object detector 1417 and memory buffer 1433 may be configurations of the tracking module 550, detection module 548 and/or learning module 538 described above in connection with FIG. 5. For example, the memory buffer 1433 may include the cache 544 in some configurations.

The motion tracker 1409 may be used to perform motion-based tracking on a current video frame (N) 1403. For example, a previous video frame (N-1) 1401 and a current video frame (N) 1403 may be received (e.g., by the electronic device 536). The previous video frame (N-1) 1401 may immediately precede a current video frame (N) 1403 in a sequence of video frames. Additional video frames may be obtained and processed by the object tracking and detection module 1407. The previous video frame (N-1) 1401 may be provided to a motion tracker 1409. Further, the memory buffer 1433 may store data associated with the previous video frame (N-1) 1401, referred to herein as a captured previous video frame 1435. In some configurations, the memory buffer 1433 may obtain information about the previous video frame (N-1) 1401 directly from the electronic device (e.g., from the camera). The memory buffer 1433 may also obtain tracking results about the previous video frame (N-1) 1401 from the fusion module 1431 which may specify where an object was tracked and/or detected in the previous video frame (N-1) 1401. This information about the previous video frame (N-1) 1401 or other previously captured video frames may be stored in the memory buffer 1433.

The motion tracker 1409 may subsequently receive a current video frame (N) 1403 in a sequence of video frames. The motion tracker 1409 may compare the current video frame (N) 1403 to the previous video frame (N-1) 1401 (e.g., using information provided from the memory buffer 1433). The motion tracker 1409 may track motion of an object on the current video frame (N) 1403 using an optical flow module 1411 (or other module with another tracking approach). The optical flow module 1411 may include hardware and/or software for performing motion-based tracking of an object on a current video frame (N) 1403. By comparing the previous video frame (N-1) 1401 and the current video frame (N) 1403, the motion tracker 1409 may determine a tracking confidence value 1413 associated with the likelihood that a target object is in the current video frame (N) 1403. In one example, the tracking confidence value is a real number (e.g., between 0 and 1) based on a percentage of certainty that the target object is within the current video frame (N) 1403 or a window within the current video frame (N) 1403.

The object detector 1417 may be used to detect an object on a current video frame (N) 1403. For example, the object detector 1417 may receive a current video frame (N) 1403 in a sequence of video frames. The object detector 1417 may perform object detection on the current video frame (N) 1403 based on a tracked parameter. The tracked parameter may include a tracking confidence value 1413 corresponding to a likelihood that a target object is being accurately tracked. More specifically, a tracked parameter may include a comparison of the tracking confidence value 1413 to a tracking threshold 1445. The tracked parameter may also include information provided from the memory buffer 1433. Some examples of tracked parameters that may be used when detecting an object include a region, a window location, a window size, or other information that may be used by the object detector 1417 as a parameter when performing object detection.

The object detector 1417 may include a scanner locator 1419. The scanner locator 1419 may include a window location selector 1421 and a randomizer 1423. The window location selector 1421 may select multiple windows within a video frame. For example, a video frame may include multiple windows, each with an associated location and size. In one configuration, each video frame is divided into multiple (e.g., approximately 10,000) overlapping windows, each including a fraction of the total pixels in the video frame. Alternatively, there may be any suitable number of windows and they may not overlap. The window location selector 1421 within the scanner locator 1419 may select the location of a window in which to attempt to identify a target object. The randomizer 1423 may randomly select windows of varying sizes and locations for detecting an object. In some configurations, the randomizer 1423 randomly selects windows within a video frame. Alternatively, the randomizer 1423 may more precisely select windows based on one or more factors. For example, the randomizer 1423 may limit the selection of windows based on a region, size or general location of where an object is most likely located. This information may be obtained via the memory buffer 1433 or may be obtained via the motion-based tracking that, while not accurate enough to be relied on entirely, may provide information that is helpful when performing object detection. Therefore, while the randomizer 1423 may randomly select multiple windows to search, the selection of windows may be narrowed, and therefore not completely random, based on information provided to the object detector 1417.

The object detector 1417 may also include a scanner scaler 1425, which may be used to draw or select a window of a certain size. The window size may be used by the scanner locator 1419 to narrow the sizes of windows when detecting an object or comparing a selection of windows to an original image to detect whether an image is within a specific window. The scanner scaler 1425 may select one or more windows of certain sizes or scale levels initially when defining an object or, alternatively, draw one or more windows of certain sizes or scale levels based on information provided from the memory buffer 1433.

The classifier 1427 may be used to determine whether some or all of a target object is found in a specific window. In some configurations, the classifier 1427 may produce a binary value for each window to indicate whether a target object is detected within a specific window or subwindow. This classification (e.g., binary classification) may be performed for each window searched by the object detector 1417. Specifically, the classifier 1427 may generate a binary 1 for each window in which the object is detected and a binary 0 for each window in which the object is not detected. Based on the number or a combination of 1s and 0s, the object detector 1417 may determine a detection confidence value 1429 indicating a likelihood that the target object is present within a current video frame (N) 1403. In some configurations, the detection confidence value 1429 is a real number between 0 and 1 indicating a percentage or probability that an object has been accurately detected. The classifier 1427 may perform pruning as described above in some configurations. For example, the classifier 1427 may prune one or more samples from a training set in order to produce a pruned training set. In some implementations, the classifier 1427 may include the pruning module 546 described in connection with FIG. 5.

The object detector 1417 may perform object detection according to a variety of tracked parameters, including a region, target size, window size, scale level, window location and one or more confidence values. Once the windows of a video frame or a subset of windows are searched and the object detector 1417 obtains a binary value for each searched window, the object detector 1417 may determine window size as well as a location or region on the current video frame that has the highest confidence. This location and window size may be used in subsequent tracking and detecting to more accurately track and/or detect a target object.

As stated above, various methods may be used by the object detector 1417 in detecting a target object. In one configuration, detecting a target object may include performing a binary classification for windows at every possible window location and every possible window size. However, searching every possible window is resource intensive. Thus, in another configuration, the object detector may search a subset of window locations and sizes, rather than all possible windows in a video frame. For example, the object detector 1417 may search 1% of all possible windows. Then, if detection is unsuccessful (e.g., the detection confidence value 1429 is less than a detection threshold 1447), a higher percentage of window locations may be searched in a subsequent captured frame, e.g., 2%. The step in percentage of window locations searched may be uniform, non-uniform, slow or fast, i.e., consecutive frames may have 1%, 2%, 3%, 4% or 1%, 2%, 4%, 8%. In one configuration, the percentage of searched frames may be set very high (e.g., 80%, 90%, 100%) in response to a high detection confidence value, i.e., to ensure that the target object is a next video frame. For example, the percentage of searched frames may jump to at least 80% in response to a detection and tracking confidence value that exceeds a detection and tracking threshold value. Alternatively, the percentage may jump to 60%, 70%, 90%, etc. Additionally, any suitable value for the detection and tracking threshold value may be used, e.g., 0.6, 0.65, 0.7, 0.75, 0.8, 0.85, etc. Furthermore, the percentage of windows searched may be determined randomly, based on a randomizer (random number generator), e.g., a random percentage of windows between 1% and 15% may be searched in a captured frame. By searching a subset of all the window locations, the object detection may use fewer resources in the electronic device.

Furthermore, the present systems and methods may search a subset of window sizes for each location. Each window size may be referred to herein as a scale level, each scale level corresponding to a specific window size. For example, there may be 20 possible scale levels. Rather than searching all 20 scale levels, a subset of scale levels or window sizes may be searched at each window location.

The present systems and methods may also use feedback from the memory buffer 1433 to tailor the window locations and sizes searched. In other words, the location and size of the last captured video frame in which the target object was successfully detected and/or tracked may be used as a starting point for searching a current video frame (N) 1403. For example, if the target object was detected and tracked in a recent video frame (i.e., the detection and tracking confidence value 1451 for a recent captured video frame is above a detection and tracking threshold), the scanner locator may start searching a current captured frame at the location and size associated with the recent frame. For example, where a target object moves out of the field of view of an optical system or disappears at a distance, the target object may be more likely to reappear at the same size as when the target object left the field of view of the optical system or disappeared at a distance. Thus, a size or range of sizes may be predicted for detecting the target object in subsequent video frames when performing object detection.

Furthermore, the search range of window locations and window sizes searched in the captured video frame (N) 1403 may be limited to those similar to the window location and window size associated with the target object in a recent video frame (e.g., the previous video frame (N-1) 1401). As used herein, the term "search range" refers to the set of candidate window locations or candidate window sizes (or both) that may be utilized when detecting and/or tracking a target object in a video frame. For example, the subset of the window locations searched may be selected from within a portion of the current video frame (N) 1403 based on where the target object was found in a recent video frame, e.g., one of the quadrants or halves of the current video frame (N) 1403. In other words, the search space may be limited to nearby where the target object was last tracked or detected. Similarly, the sizes of frames searched for each window location may be limited based on the size of the window in which the targeted object was found in a recent video frame. For example, if the object was detected in a recent frame using a window with a scale level of 8, the scanner scaler 1425 may select only window scale levels for the current video frame (N) 1403 of 8, plus or minus 3, i.e., scale levels 5-11. This may further eliminate low probability searching and increase the efficiency of object detection. Alternatively, if a recent (non-current) video frame did not detect the target object (i.e., the detection and tracking confidence value 1451 for the recent video frame is below a detection and tracking threshold), the object detector 1417 may expand the search space (window locations) that is searched, e.g., a wider range of an image or the whole image may be subject to search.

The object tracking and detection module 1407 may include a fusion module 1431 to merge multiple windows to form a single window. The fusion module 1431 may be one example of the fusion module described above in connection with FIG. 5. There may be initially two confidence values: a detection confidence value 1429 from the object detector 1417 and a tracking confidence value 1413 from the motion tracker 1409. The fusion module 1431 may combine the two confidence values (e.g., pick the one that is larger) into a detection and tracking confidence value 1451. The detection and tracking confidence value 1451 may indicate whether the target object was identified on a video frame. In one configuration, the detection and tracking confidence value 1451 may be a real number between 0 and 1, where 0 indicates the lowest possible confidence that the target object was identified in a particular video frame and 1 indicates the highest possible confidence that the target object was identified in a particular video frame. In other words, the detection and tracking confidence value 1451 may serve as an overall indication of the likelihood that a target object was found. Further, the detection and tracking confidence value 1451 may be a parameter used for determining a window location, window size or percentage of windows to search in a next video frame. The fusion module 1431 may be used to provide information about a current video frame (N) 1403 to the memory buffer 1433. In one example, the fusion module 1431 may provide information about the tracked window 1437 (e.g., window location 1439, window size 1441, etc.) and a detection and tracking confidence value 1451 to the memory buffer 1433. The fusion module 1431 may use the tracking results (e.g., bounding boxes) from the motion tracker 1409 and object detector 1417 to form a combined tracking result (e.g., bounding box) and calculate the detection and tracking confidence value 1451.

The memory buffer 1433 may store one or more values associated with the previous video frame (N-1) 1401, the current video frame (N) 1403 or other captured video frames. In one configuration, the memory buffer 1433 stores a captured previous video frame 1435, which may include information corresponding to the previous video frame (N-1) 1401. The captured previous video frame 1435 may include information about one or more windows 1437, including the location 1439, window size 1441 and a binary decision 1443 (e.g., from the classifier 1427) for each window 1437. The captured previous video frame 1435 may also include a tracking threshold 1445, detection threshold 1447 and a detection and tracking threshold 1449. The tracking threshold 1445 may be provided to the motion tracker 1409 or circuitry on the object tracking and detection module (e.g., confidence level comparator 1415) to determine whether the tracking confidence level is greater than the tracking threshold 1445. The detection threshold 1447 may be provided to the object detector 1417 or other circuitry on the object tracking and detection module 1407 to determine whether the detection confidence value 1429 is greater than the detection threshold 1447. The detection and tracking threshold 1449 may be a combined value based on the tracking threshold 1445 and the detection threshold 1447. The detection and tracking threshold 1449 may be compared to a detection and tracking confidence value 1451 to determine a combined confidence value for the motion-based tracking and the object detection. Each of the thresholds may be based on a likelihood that a target object is located within a video frame. The object tracking and detection module 1407 may perform motion-based tracking and/or detection on a current video frame (N) 1403 until a specific detection and tracking confidence value 1451 is obtained. Further, the motion-based tracking and object detection may be performed on each video frame in a sequence of multiple video frames.

Performing motion-based tracking and object detection may include sequentially performing motion-based tracking followed by object detection based on a tracked parameter. In particular, the present systems and methods may implement a two-step tracking and detection approach. Since motion-based tracking is based on relative motion of a scene, rather than actual object identification as used object detection, the motion-based tracking may be less resource-intensive in an electronic device than performing object detection. Accordingly, it may be more efficient to use the motion tracker 1409 instead of the object detector 1417, where a target object may be accurately tracked without also performing object detection.

Therefore, rather than using the motion tracker 1409 in parallel with the object detector 1417, the object tracking and detection module 1407 only uses the object detector 1417 where the motion tracker 1409 is insufficient, i.e., the motion tracking and object detection (if performed at all) are performed sequentially instead of in parallel. For each video frame on which tracking is performed, the motion tracker 1409 may produce a tracking confidence value 1413, which may be a real number between 0 and 1 indicating a likelihood that the target object is in a current video frame (N) 1403.

In one configuration of the two-step tracking and detection approach, the motion tracker 1409 may first perform motion-based tracking on a current video frame (N) 1403. The motion tracker 1409 may determine a tracking confidence value 1413 based on the motion-based tracking process. Using the tracking confidence value 1413 and a tracking threshold 1445 provided by the memory buffer 1433, circuitry within the object tracking and detection module 1407 (e.g., a confidence level comparator) may determine 1415 whether the tracking confidence value 1413 exceeds a tracking threshold 1445. If the tracking confidence value 1413 is greater than the tracking threshold 1445, the object tracking and detection module 1407 may skip performing object detection and provide the tracking result to a fusion module 1431 to produce an output 1453. The output 1453 may include an indication that a target object is within a current video frame (N) 1403. Further, the output 1453 may include additional information about the target object.

If the tracking confidence value 1413 does not exceed the tracking threshold 1445, the object detector 1417 may subsequently perform object detection on the current video frame (N) 1403. The object detection may be performed on all or a subset of windows within the current video frame (N) 1403. The object detector 1417 may also select a subset of windows, window sizes or other detection criteria based on results of the motion-based tracking and/or information provided from the memory buffer 1433. The object detection may be performed using a more or less robust process based on one or more tracked parameters provided to the object detector 1417. The object detector 1417 may determine a detection confidence value 1429 and compare the detection confidence value 1429 to a detection threshold 1447. If the detection confidence value 1429 is above a detection threshold 1447, the object detector 1417 may provide the detection result to the fusion module 1431 to produce an output 1453. The output may include an indication that a target object is within a current video frame (N) 1403 and/or include additional information about the detected object.

Alternatively, if the detection confidence value 1429 is less than or equal to a detection threshold 1447, the object detector 1417 may perform object detection again using a more robust method, such as searching a greater number of windows within the current video frame (N) 1403. The object detector 1417 may repeat the process of object detection until a satisfactory detection confidence value 1429 is obtained. Once a satisfactory detection confidence value 1429 is obtained such that a target object within the current video frame is identified, the object tracking and detection module 1407 may be used to perform tracking and detection on a next video frame.

FIG. 14 illustrates some components being implemented by a processor 1405. As shown in FIG. 14, the object tracking and detection module 1407 may be implemented by a processor 1405. Different processors may be used to implement different components (e.g., one processor may implement the motion tracker 1409, another processor may be used to implement the object detector 1417 and yet another processor may be used to implement the memory buffer 1433).

Figure 15:
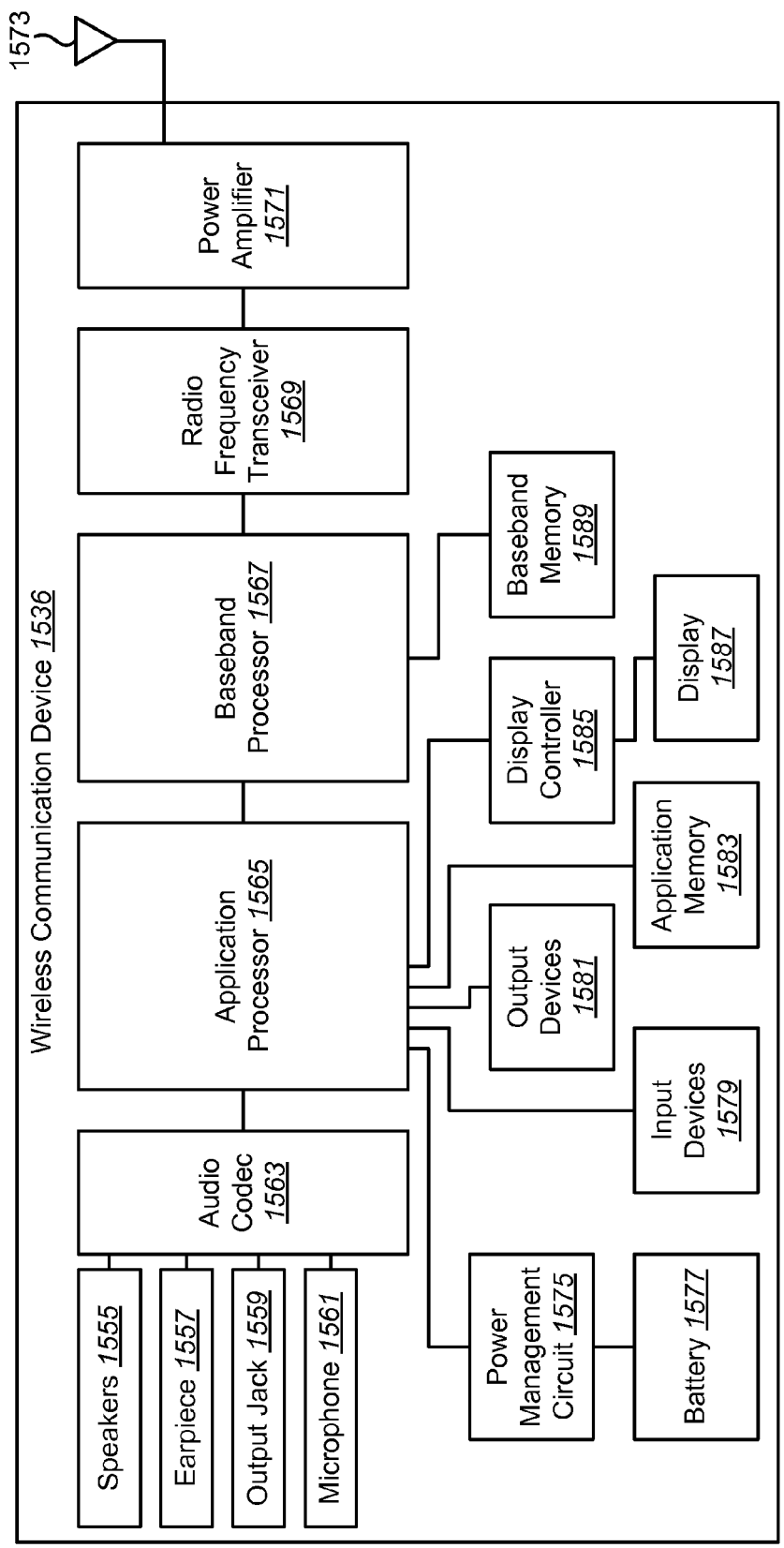
FIG. 15 is a block diagram illustrating one configuration of a wireless communication device in which systems and methods for object classification, object detection and memory management may be implemented.

FIG. 15 is a block diagram illustrating one configuration of a wireless communication device 1536 in which systems and methods for object classification, object detection and memory management may be implemented. The wireless communication device 1536 illustrated in FIG. 15 may be an example of one or more of the electronic devices described herein. The wireless communication device 1536 may include an application processor 1565. The application processor 1565 generally processes instructions (e.g., runs programs) to perform functions on the wireless communication device 1536. In some configurations, the application processor 1565 may perform and/or implement one or more of the steps, procedures, functions, methods, etc., described herein for sample pruning, object classification, object detection and/or memory management, for example. The application processor 1565 may be coupled to an audio coder/decoder (codec) 1563.

The audio codec 1563 may be used for coding and/or decoding audio signals. The audio codec 1563 may be coupled to at least one speaker 1555, an earpiece 1557, an output jack 1559 and/or at least one microphone 1561. The speakers 1555 may include one or more electro-acoustic transducers that convert electrical or electronic signals into acoustic signals. For example, the speakers 1555 may be used to play music or output a speakerphone conversation, etc. The earpiece 1557 may be another speaker or electro-acoustic transducer that can be used to output acoustic signals (e.g., speech signals) to a user. For example, the earpiece 1557 may be used such that only a user may reliably hear the acoustic signal. The output jack 1559 may be used for coupling other devices to the wireless communication device 1536 for outputting audio, such as headphones. The speakers 1555, earpiece 1557 and/or output jack 1559 may generally be used for outputting an audio signal from the audio codec 1563. The at least one microphone 1561 may be an acousto-electric transducer that converts an acoustic signal (such as a user's voice) into electrical or electronic signals that are provided to the audio codec 1563.

The application processor 1565 may also be coupled to a power management circuit 1575. One example of a power management circuit 1575 is a power management integrated circuit (PMIC), which may be used to manage the electrical power consumption of the wireless communication device 1536. The power management circuit 1575 may be coupled to a battery 1577. The battery 1577 may generally provide electrical power to the wireless communication device 1536. For example, the battery 1577 and/or the power management circuit 1575 may be coupled to at least one of the elements included in the wireless communication device 1536.

The application processor 1565 may be coupled to at least one input device 1579 for receiving input. Examples of input devices 1579 include infrared sensors, image sensors, accelerometers, touch sensors, keypads, etc. The input devices 1579 may allow user interaction with the wireless communication device 1536. The application processor 1565 may also be coupled to one or more output devices 1581. Examples of output devices 1581 include printers, projectors, screens, haptic devices, etc. The output devices 1581 may allow the wireless communication device 1536 to produce output that may be experienced by a user.

The application processor 1565 may be coupled to application memory 1583. The application memory 1583 may be any electronic device that is capable of storing electronic information. Examples of application memory 1583 include double data rate synchronous dynamic random access memory (DDRAM), synchronous dynamic random access memory (SDRAM), flash memory, etc. The application memory 1583 may provide storage for the application processor 1565. For instance, the application memory 1583 may store data and/or instructions for the functioning of programs that are run on the application processor 1565.

The application processor 1565 may be coupled to a display controller 1585, which in turn may be coupled to a display 1587. The display controller 1585 may be a hardware block that is used to generate images on the display 1587. For example, the display controller 1585 may translate instructions and/or data from the application processor 1565 into images that can be presented on the display 1587. Examples of the display 1587 include liquid crystal display (LCD) panels, light emitting diode (LED) panels, cathode ray tube (CRT) displays, plasma displays, etc.

The application processor 1565 may be coupled to a baseband processor 1567. The baseband processor 1567 generally processes communication signals. For example, the baseband processor 1567 may demodulate and/or decode received signals. Additionally or alternatively, the baseband processor 1567 may encode and/or modulate signals in preparation for transmission.

The baseband processor 1567 may be coupled to baseband memory 1589. The baseband memory 1589 may be any electronic device capable of storing electronic information, such as SDRAM, DDRAM, flash memory, etc. The baseband processor 1567 may read information (e.g., instructions and/or data) from and/or write information to the baseband memory 1589. Additionally or alternatively, the baseband processor 1567 may use instructions and/or data stored in the baseband memory 1589 to perform communication operations.

The baseband processor 1567 may be coupled to a radio frequency (RF) transceiver 1569. The RF transceiver 1569 may be coupled to a power amplifier 1571 and one or more antennas 1573. The RF transceiver 1569 may transmit and/or receive radio frequency signals. For example, the RF transceiver 1569 may transmit an RF signal using a power amplifier 1571 and at least one antenna 1573. The RF transceiver 1569 may also receive RF signals using the one or more antennas 1573.

Figure 16:
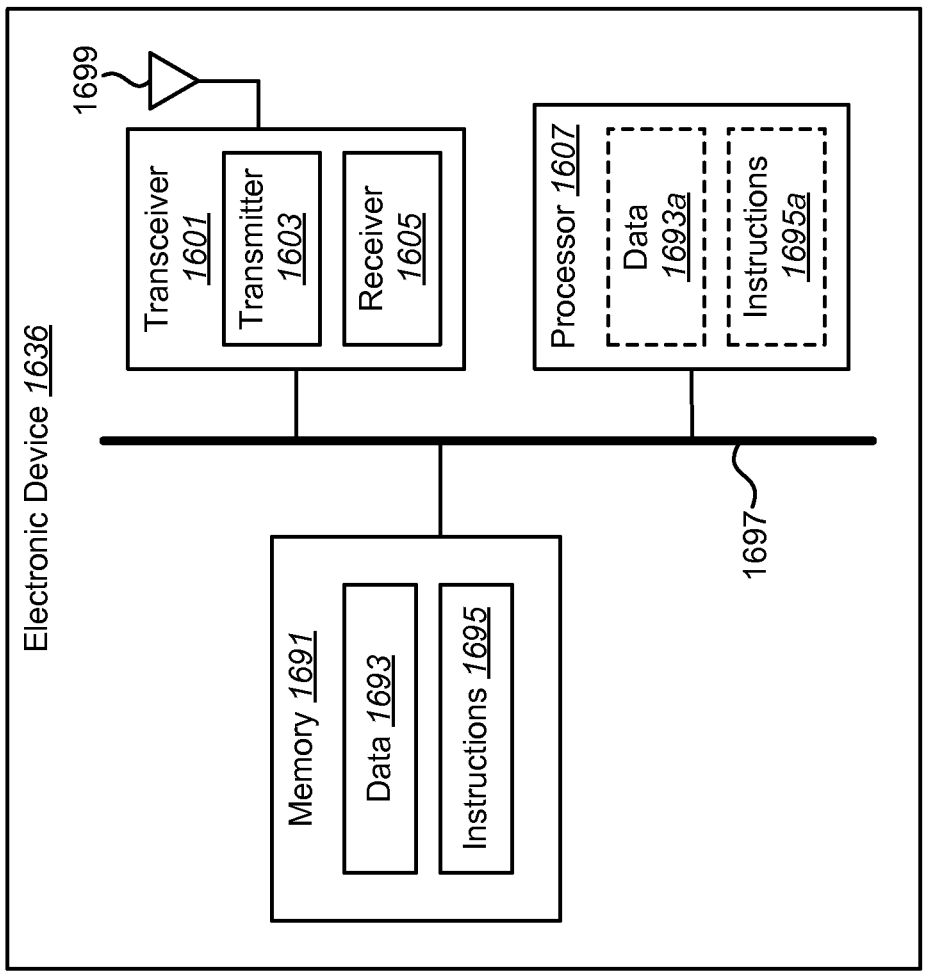
FIG. 16 illustrates certain components that may be included within an electronic device.

FIG. 16 illustrates certain components that may be included within an electronic device 1636. The electronic device 1636 described in connection with FIG. 16 may be an example of and/or may be implemented in accordance with one or more of the electronic devices described herein.

The electronic device 1636 includes a processor 1607. The processor 1607 may be a general purpose single- or multi-chip microprocessor (e.g., an ARM), a special purpose microprocessor (e.g., a digital signal processor (DSP)), a microcontroller, a programmable gate array, etc. The processor 1607 may be referred to as a central processing unit (CPU). Although just a single processor 1607 is shown in the electronic device 1636 of FIG. 16, in an alternative configuration, a combination of processors (e.g., an ARM and DSP) could be used.

The electronic device 1636 also includes memory 1691 in electronic communication with the processor 1607 (i.e., the processor 1607 can read information from and/or write information to the memory 1691). The memory 1691 may be any electronic component capable of storing electronic information. The memory 1691 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1693 and instructions 1695 may be stored in the memory 1691. The instructions 1695 may include one or more programs, routines, sub-routines, functions, procedures, code, etc. The instructions 1695 may include a single computer-readable statement or many computer-readable statements. The instructions 1695 may be executable by the processor 1607 to implement one or more of the methods described above. Executing the instructions 1695 may involve the use of the data 1693 that is stored in the memory 1691. FIG. 16 shows some instructions 1695a and data 1693a being loaded into the processor 1607.

The electronic device 1636 may also include a transmitter 1603 and a receiver 1605 to allow transmission and reception of signals between the electronic device 1636 and a remote location (e.g., a base station). The transmitter 1603 and receiver 1605 may be collectively referred to as a transceiver 1601. An antenna 1699 may be electrically coupled to the transceiver 1601. The electronic device 1636 may also include (not shown) multiple transmitters, multiple receivers, multiple transceivers and/or multiple antenna.

The various components of the electronic device 1636 may be coupled together by one or more buses, which may include a power bus, a control signal bus, a status signal bus, a data bus, etc. For simplicity, the various buses are illustrated in FIG. 16 as a bus system 1697.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for object classification by an electronic device, comprising:
    obtaining an image frame that includes an object;
    determining samples from the image frame, wherein each of the samples represents a multidimensional feature vector, wherein the samples comprise non-support vector negative samples, non-support vector positive samples, and support vector samples;
    adding the samples to a training set for the image frame;
    pruning one or more samples from the training set to produce a pruned training set, wherein one or more of the non-support vector negative samples are pruned first, wherein one or more of the non-support vector positive samples are pruned second based on a comparison between a number of samples remaining after pruning the one or more non-support vector negative samples and a sample number threshold, and wherein one or more of the support vector samples are pruned third if necessary to avoid exceeding the sample number threshold; and
    updating classifier model weights based on the pruned training set.

2. The method of claim 1, wherein all non-support vector negative samples are pruned from the training set.

3. The method of claim 1, further comprising selecting the one or more non-support vector positive samples at random.

4. The method of claim 1, further comprising:
    selecting the one or more non-support vector positive samples based on a distance between each of the one or more non-support vector positive samples and a decision boundary; and
    ordering the one or more non-support vector positive samples for pruning based on the distance, wherein the one or more non-support vector positive samples with larger distances are pruned first.

5. The method of claim 1, further comprising:
    selecting the one or more non-support vector positive samples based on an age of the one or more non-support vector positive samples; and
    ordering the one or more non-support vector positive samples for pruning based on the age, wherein the one or more non-support vector positive samples with greater ages are pruned first.

6. The method of claim 1, further comprising selecting the one or more support vector samples at random.

7. The method of claim 1, further comprising:
    selecting the one or more support vector samples based on an alpha value; and
    ordering the one or more support vector samples for pruning based on the alpha value, wherein the one or more support vector samples with smaller alpha values are pruned first.

8. The method of claim 1, wherein the samples added to the training set include support vector samples and incorrectly classified samples.

9. The method of claim 1, wherein adding the samples to the training set comprises storing the samples in a cache, and wherein pruning the one or more samples comprises removing the one or more samples from the cache.

10. The method of claim 1, wherein the pruning limits memory usage growth for a sequence of image frames and reduces training time for the sequence of image frames.

11. The method of claim 1, further comprising reducing feature vectors based on associated weights to produce a reduced feature vector set.

12. An electronic device for object classification, comprising:
a processor;
memory in electronic communication with the processor;
instructions stored in the memory, the instructions being executable to:
obtain an image frame that includes an object;
determine samples from the image frame, wherein each of the samples represents a multidimensional feature vector, wherein the samples comprise non-support vector negative samples, non-support vector positive samples, and support vector samples;
add the samples to a training set for the image frame;
prune one or more samples from the training set to produce a pruned training set, wherein one or more of the non-support vector negative samples are pruned first, wherein one or more of the non-support vector positive samples are pruned second based on a comparison between a number of samples remaining after pruning the one or more non-support vector negative samples and a sample number threshold, and wherein one or more of the support vector samples are pruned third if necessary to avoid exceeding the sample number threshold; and
update classifier model weights based on the pruned training set.

13. The electronic device of claim 12, wherein all non-support vector negative samples are pruned from the training set.

14. The electronic device of claim 12, wherein the instructions are further executable to select the one or more non-support vector positive samples at random.

15. The electronic device of claim 12, wherein the instructions are further executable to:
select the one or more non-support vector positive samples based on a distance between each of the one or more non-support vector positive samples and a decision boundary; and
order the one or more non-support vector positive samples for pruning based on the distance, wherein the one or more non-support vector positive samples with larger distances are pruned first.

16. The electronic device of claim 12, wherein the instructions are further executable to:
select the one or more non-support vector positive samples based on an age of the one or more non-support vector positive samples; and
order the one or more non-support vector positive samples for pruning based on the age, wherein the one or more non-support vector positive samples with greater ages are pruned first.

17. The electronic device of claim 12, wherein the instructions are further executable to select the one or more support vector samples at random.

18. The electronic device of claim 12, wherein the instructions are further executable to:
select the one or more support vector samples based on an alpha value; and
order the one or more support vector samples for pruning based on the alpha value, wherein the one or more support vector samples with smaller alpha values are pruned first.

19. The electronic device of claim 12, wherein the samples added to the training set include support vector samples and incorrectly classified samples.

20. The electronic device of claim 12, wherein adding the samples to the training set comprises storing the samples in a cache, and wherein pruning the one or more samples comprises removing the one or more samples from the cache.

21. The electronic device of claim 12, wherein the pruning limits memory usage growth for a sequence of image frames and reduces training time for the sequence of image frames.

22. The electronic device of claim 12, wherein the instructions are further executable to reduce feature vectors based on associated weights to produce a reduced feature vector set.

23. A computer-program product for object classification, comprising a non-transitory tangible computer-readable medium having instructions thereon, the instructions comprising:
code for causing an electronic device to obtain an image frame that includes an object;
code for causing the electronic device to determine samples from the image frame, wherein each of the samples represents a multidimensional feature vector, wherein the samples comprise non-support vector negative samples, non-support vector positive samples, and support vector samples;
code for causing the electronic device to add the samples to a training set for the image frame;
code for causing the electronic device to prune one or more samples from the training set to produce a pruned training set, wherein one or more of the non-support vector negative samples are pruned first, wherein one or more of the non-support vector positive samples are pruned second based on a comparison between a number of samples remaining after pruning the one or more non-support vector negative samples and a sample number threshold, and wherein one or more of the support vector samples are pruned third if necessary to avoid exceeding the sample number threshold; and
code for causing the electronic device to update classifier model weights based on the pruned training set.

24. The computer-program product of claim 23, wherein all non-support vector negative samples are pruned from the training set.

25. The computer-program product of claim 23, wherein the samples added to the training set include support vector samples and incorrectly classified samples.

26. The computer-program product of claim 23, further comprising code for causing the electronic device to reduce feature vectors based on associated weights to produce a reduced feature vector set.

27. An apparatus for object classification, comprising:
means for obtaining an image frame that includes an object;
means for determining samples from the image frame, wherein each of the samples represents a multidimensional feature vector, wherein the samples comprise non-support vector negative samples, non-support vector positive samples, and support vector samples;
means for adding the samples to a training set for the image frame;
means for pruning one or more samples from the training set to produce a pruned training set, wherein one or more of the non-support vector negative samples are pruned first, wherein one or more of the non-support vector positive samples are pruned second based on a comparison between a number of samples remaining after pruning the one or more non-support vector negative samples and a sample number threshold, and wherein one or more of the support vector samples are pruned third if necessary to avoid exceeding the sample number threshold; and means for updating classifier model weights based on the pruned training set.

28. The apparatus of claim 27, wherein all non-support vector negative samples are pruned from the training set.

29. The apparatus of claim 27, wherein the samples added to the training set include support vector samples and incorrectly classified samples.

30. The apparatus of claim 27, further comprising means for reducing feature vectors based on associated weights to produce a reduced feature vector set.

* * * * *